(12) United States Patent
Kortmann

(10) Patent No.: US 8,651,766 B2
(45) Date of Patent: Feb. 18, 2014

(54) WIND, SOLAR AND HYBRID WIND-SOLAR WATER CIRCULATION AND AERATION METHODS AND APPARATUS

(76) Inventor: Robert W. Kortmann, Coventry, CT (US)

( * ) Notice: Subject to any disclaimer, the term of this patent is extended or adjusted under 35 U.S.C. 154(b) by 341 days.

(21) Appl. No.: 12/966,209

(22) Filed: Dec. 13, 2010

(65) Prior Publication Data

US 2011/0147289 A1 Jun. 23, 2011

Related U.S. Application Data

(60) Provisional application No. 61/284,450, filed on Dec. 18, 2009.

(51) Int. Cl.
*E02B 9/00* (2006.01)

(52) U.S. Cl.
USPC ............... 405/52; 405/75; 290/55; 261/87; 261/93; 261/120

(58) Field of Classification Search
USPC ............... 405/52, 75, 79, 303; 210/170.09, 210/170.11; 290/55; 366/279, 331; 261/87, 261/93, 120
See application file for complete search history.

(56) References Cited

U.S. PATENT DOCUMENTS

| | | | | |
|---|---|---|---|---|
| 2,444,671 A * | 7/1948 | Prager | ........................... | 210/197 |
| 3,540,222 A * | 11/1970 | Mendelson | ..................... | 405/52 |
| 3,865,721 A * | 2/1975 | Kaelin | ......................... | 210/627 |
| 4,030,859 A * | 6/1977 | Henegar | ......................... | 417/61 |
| 4,443,338 A * | 4/1984 | Reid | ............................. | 210/629 |
| 4,764,313 A * | 8/1988 | Cameron et al. | ................ | 261/35 |
| 2009/0191057 A1* | 7/2009 | Knutson | ......................... | 416/23 |
| 2010/0172759 A1* | 7/2010 | Sullivan | ......................... | 416/41 |

FOREIGN PATENT DOCUMENTS

GB 2460551 * 8/2009

* cited by examiner

*Primary Examiner* — Sean Andrish
(74) *Attorney, Agent, or Firm* — Alix, Yale & Ristas, LLP

(57) ABSTRACT

Circulation and aeration systems for ponds, lakes, sounds, treatment basins, and other bodies of water. In one set of embodiments, water is pumped in a downward direction to circulate ambient oxygen from the atmosphere and produced by plant photosynthesis to deeper strata. In other embodiments, water is circulated within predetermined depth strata. Each system preferably includes a wind turbine, a drive shaft, and an impeller array. Some systems include conduits for conveying and mixing water from and to selected depth strata, or configured as an open impeller-mixing apparatus. Alternative embodiments include systems which incorporate electrical power generation by the wind turbine, solar power generation and use hybrid wind-solar apparatus, and combinations of land-based and in-water based apparatus. A pneumatic pump diffuser and a control flow centered orifice diffuser line are employed in some embodiments.

14 Claims, 24 Drawing Sheets

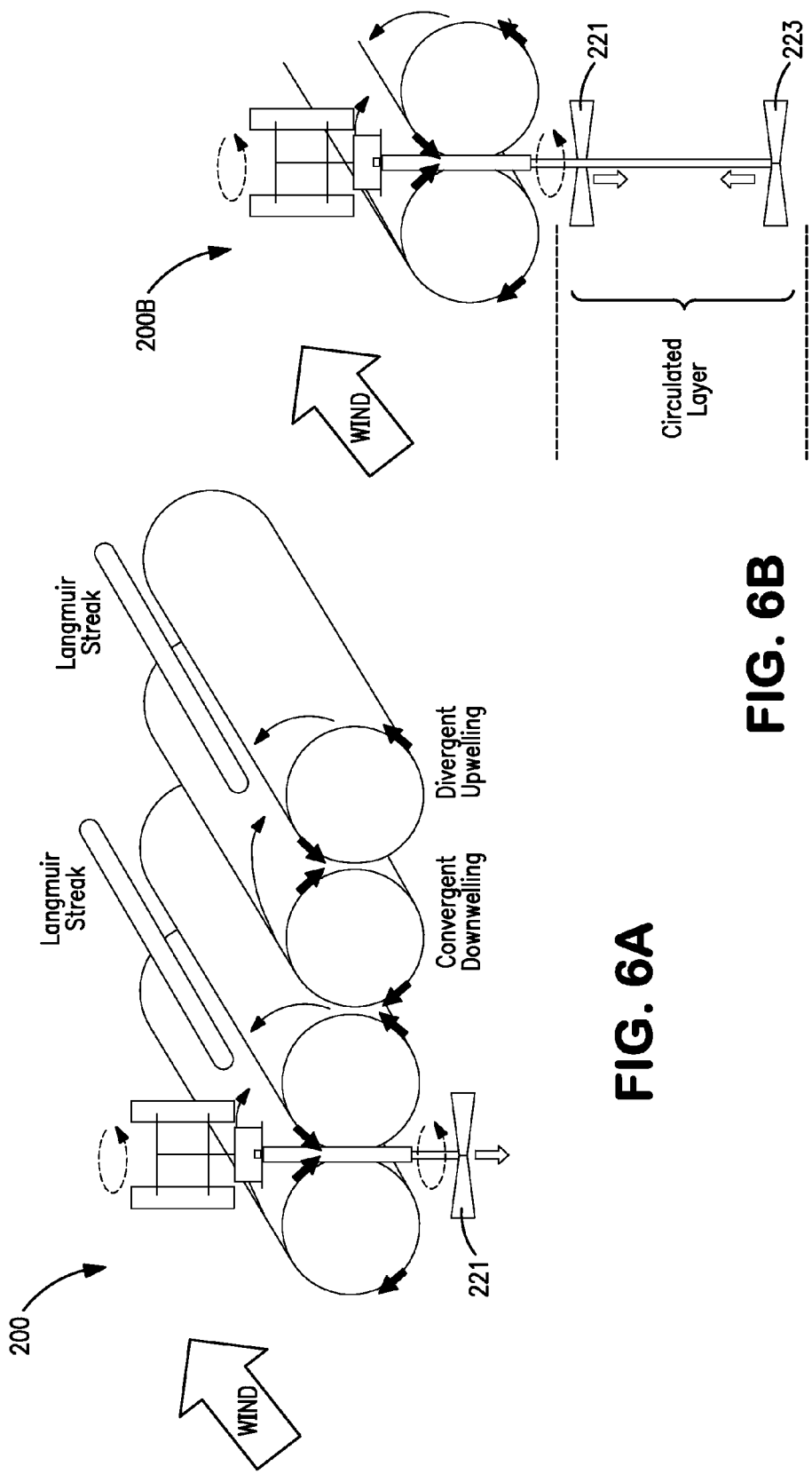

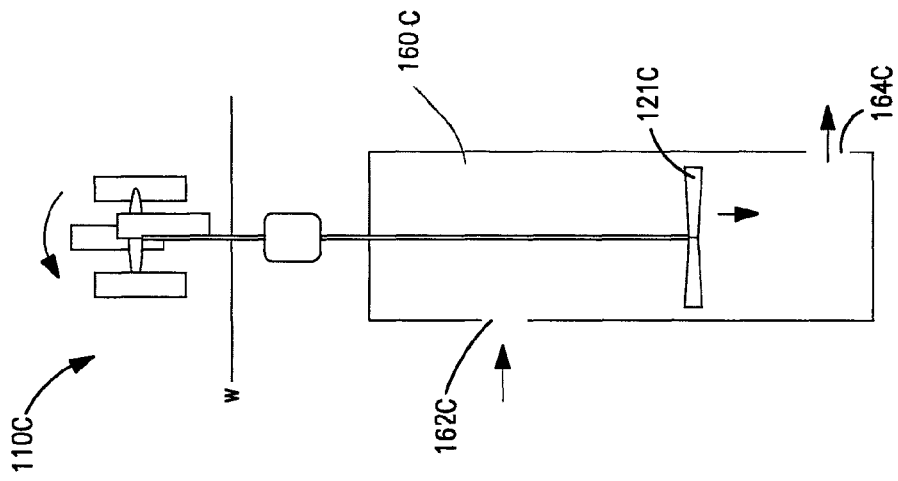
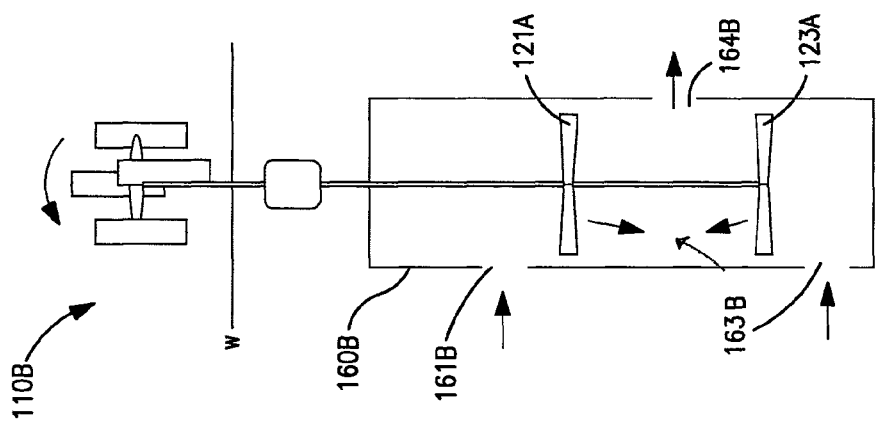
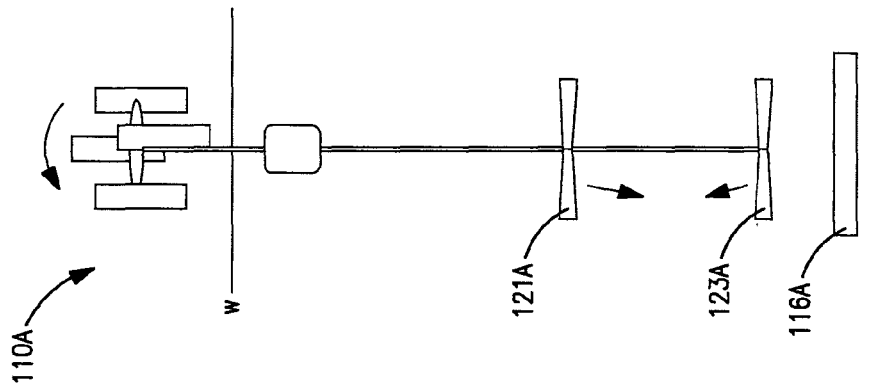

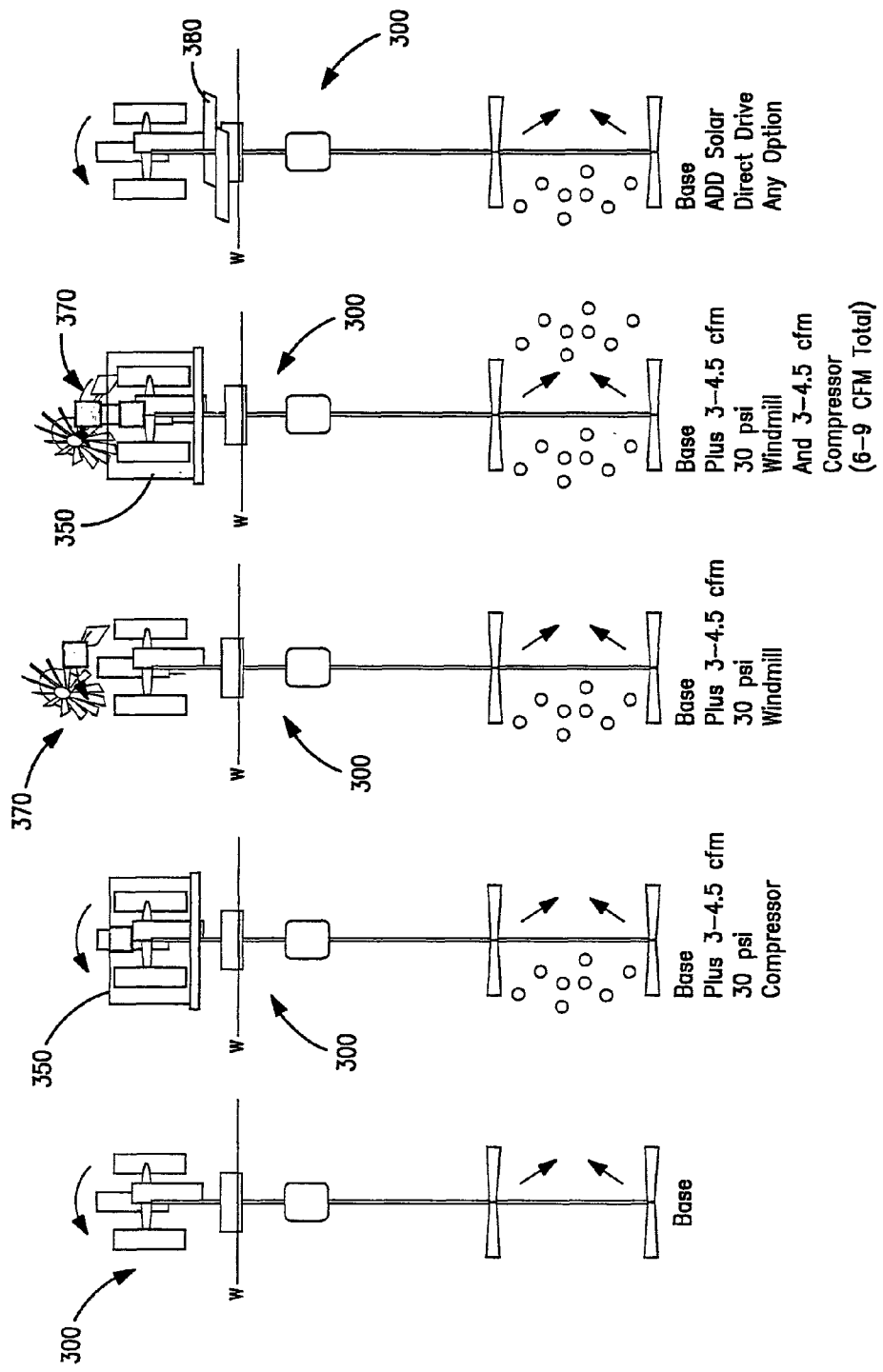

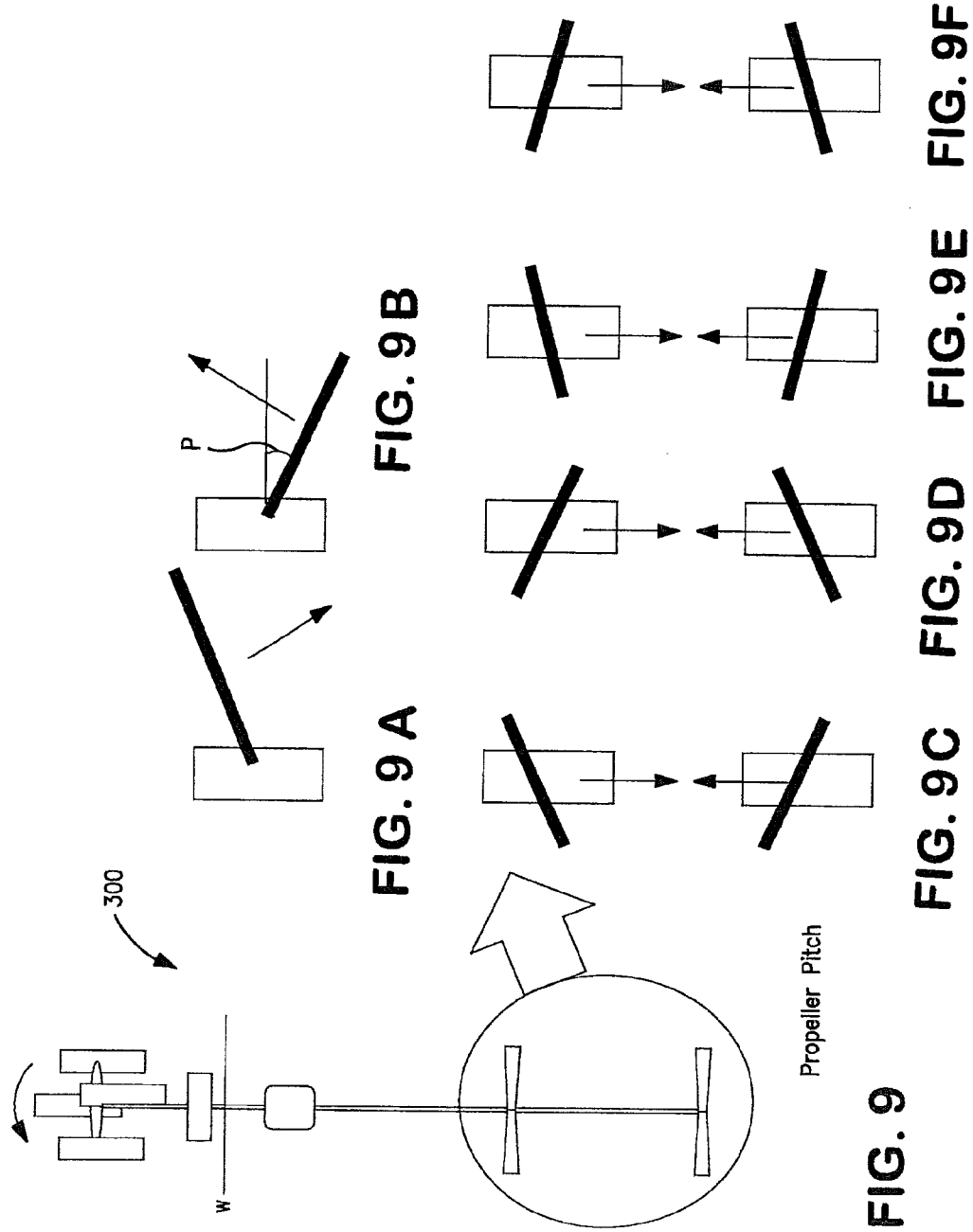

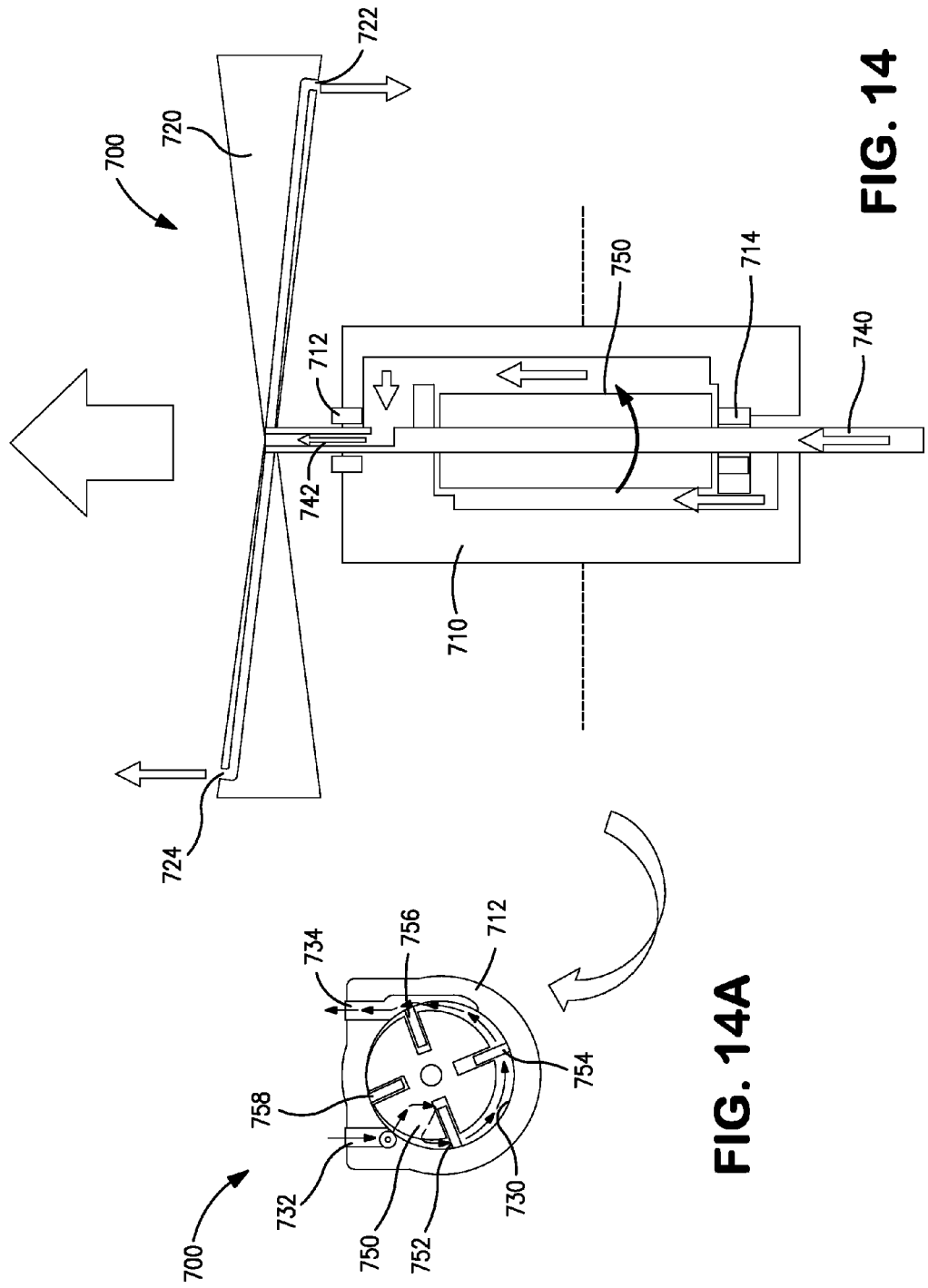

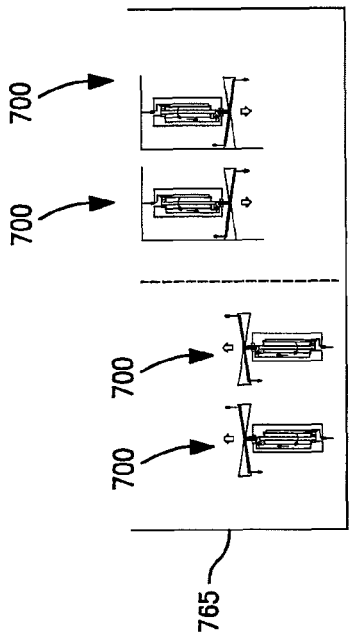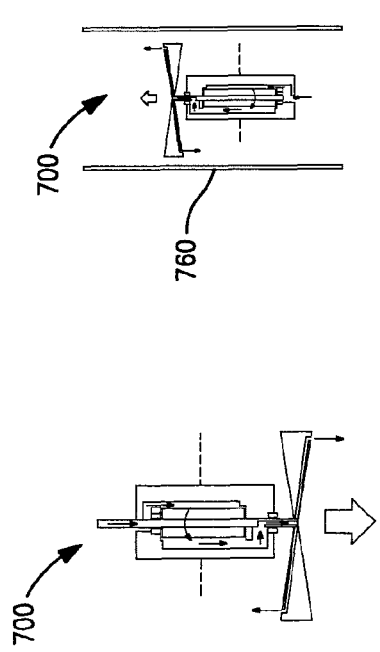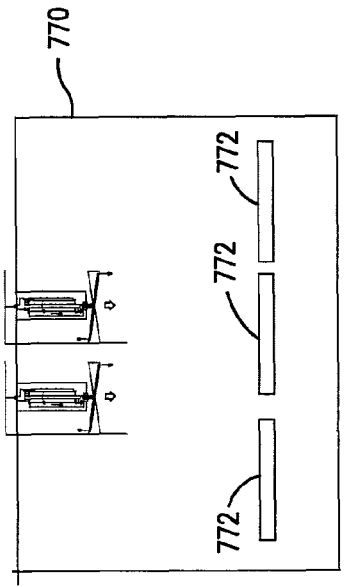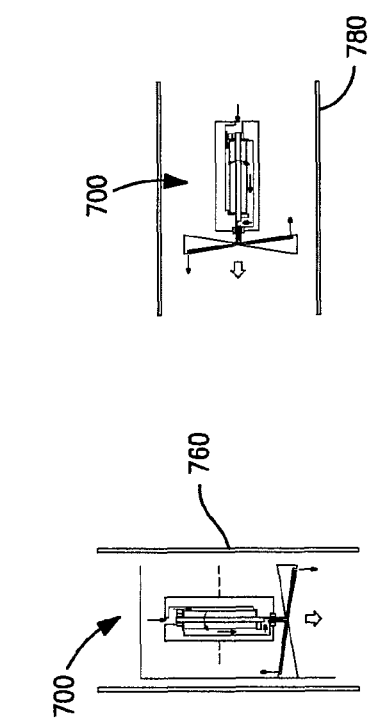
FIG. 15A  FIG. 15B  FIG. 15C
FIG. 15D  FIG. 15E  FIG. 15F

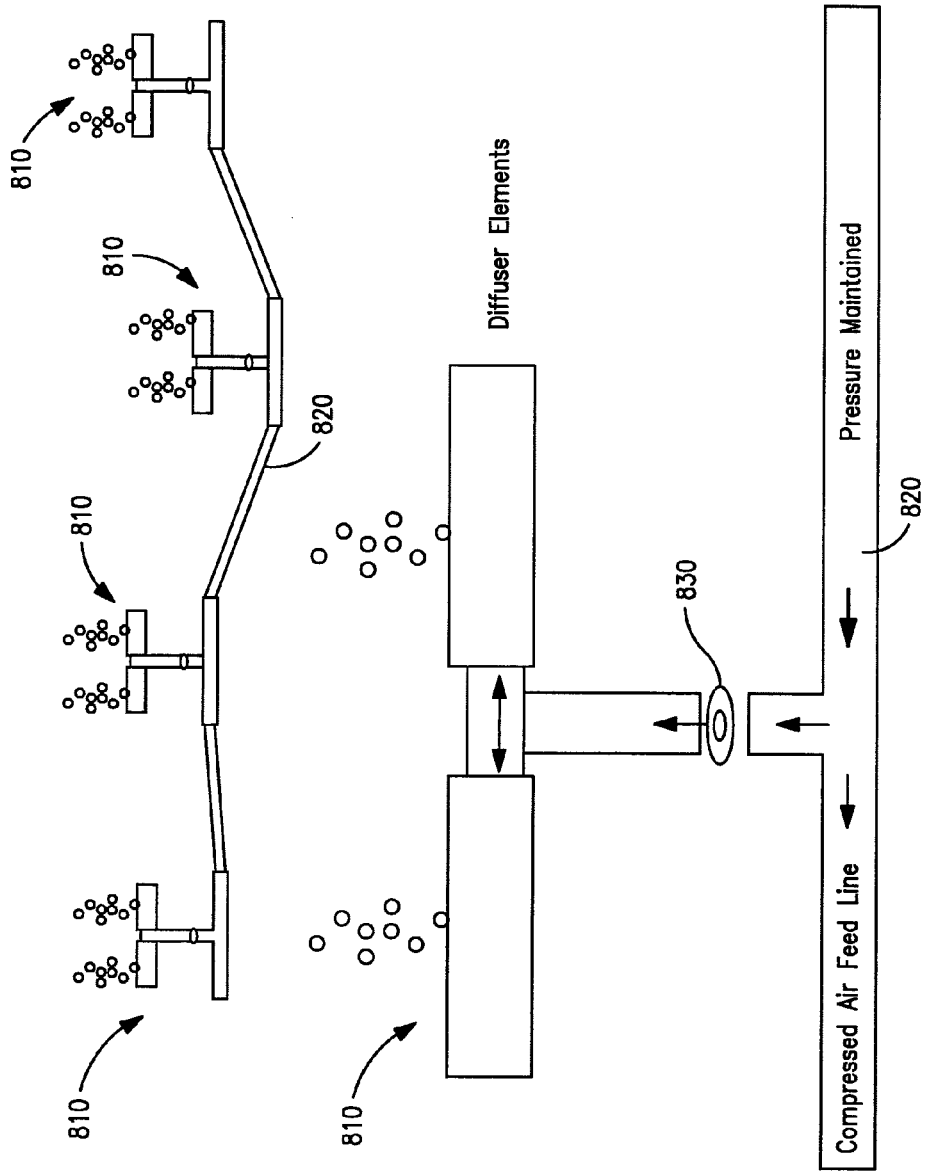

WIND, SOLAR AND HYBRID WIND-SOLAR WATER CIRCULATION AND AERATION METHODS AND APPARATUS

CROSS-REFERENCE TO RELATED APPLICATION

This application claims the benefit of U.S. Provisional Patent Application No. 61/284,450 filed on Dec. 18, 2009, the entirety of which is incorporated herein by reference.

BACKGROUND

1. Field of the Invention

This invention relates to the field of aeration and circulation systems for ponds, lakes, sounds, treatment basins and other bodies of water; and especially to the field of aeration and circulation systems for bodies of water which experience periods of thermal-density stratification and oxygen depletion.

2. Discussion

Deep dimictic lakes typically exhibit a well mixed surface layer (epilimnion), a mid-depth where temperature decreases rapidly with increasing depth (metalimnion), and a uniformly cold deep layer (hypolimnion). Oxygen is supplied to the surface of the body of water from the atmosphere. Oxygen is also produced by photosynthesis within the body of water. When light penetration is limited, oxygen production by photosynthesis only occurs in upper strata. In more shallow water bodies such as, for example, lakes, estuaries, sounds and treatment basins that exhibit very high oxygen demand over the bottom, a weak or intermittent thermal stratification can occur and can result in oxygen depletion in deeper strata. The deep strata oxygen consumption rate and oxygen demands at the sediment/water interface can exceed the oxygen replenishment rate from the atmosphere and photosynthetic production near the surface.

The loss of dissolved oxygen from waters at various depths can have serious water quality consequences including:

Loss of desirable habitat for fish and other aerobic aquatic organisms;

Accumulation of nutrients and anaerobic respiration products such as iron, manganese, hydrogen sulfide, phosphorus, ammonia and other constituents; and Increased eutrophication and degradation of resource quality for recreation, habitat, and water supply.

The thermal density stratification and oxygen depletion is characterized by an index: relative thermal resistance to mixing (RTRM). Intervention may be required to increase and enhance circulation and aeration to improve and maintain water quality.

SUMMARY

Briefly stated, an apparatus for circulating water in a body of water employs a wind turbine. A shaft is driven by the turbine. At least one impeller is coupled to the shaft for rotation therewith. A buoyancy module is disposed adjacent the shaft to maintain the shaft in an upright vertical orientation when a substantial portion of the shaft and the at least one impeller is submerged in the body of water. Exposure of the wind turbine to environmental wind and disposition of the impeller in the body of water causes the impeller to rotate to thereby circulate water to and from selected depths.

The apparatus can be configured to produce a mixing or blending of a depth strata, a downdraft circulation, or an updraft circulation within the body of water. In one embodiment, the apparatus includes a conduit. The impeller unit, or plurality of impellers, is disposed in the conduit and produces either a downdraft or an updraft pumping within the conduit. For some embodiments, the apparatus produces both a downdraft and an updraft pumping.

The apparatus may also comprise a conduit chamber with an intake port and an output port. At least one impeller is disposed in the conduit chamber and operable to circulate water from the intake port to the output port for depth-selective circulation of any vertical depth strata range.

The apparatus may also comprise a plurality of impellers spaced along the shaft. The apparatus can be configured to produce a downdraft circulation path, an updraft circulation path or a combination of downdraft and updraft circulation paths.

The apparatus may employ a wind turbine, which comprises either a direct drive vertical axis wind turbine or a horizontal axis wind turbine which rotatably couples with the shaft. The apparatus in one embodiment comprises a pumping chamber. At least one impeller is disposed within the pumping chamber. A direct drive compressor is coupled to the wind turbine to produce compressed air. An alternator stator is coupled to the wind turbine to generate electricity in some embodiments. In addition, a battery bank, a controller and a motor is drivably couplable to the shaft wherein the electricity from the alternator stator is employed to power the motor.

A solar voltaic array may be employed. A battery bank in communication with the array and a motor powered by the battery bank drives the shaft or a compressor may be employed. In some embodiments, the wind turbine is a vertical axis wind turbine and a horizontal axis wind turbine is integrated with the vertical axis wind turbine. The vertical axis wind turbine is coupled to the shaft for pumping circulation and to produce compressed air for diffusion into the water.

For some embodiments, a surface flotation platform mooring system employs an anchor system. At least one pulley is connected to the flotation platform. A cable connects the anchor, extends around the pulley and connects with a weight. The vertical spacing between the anchor and the flotation platform varies according to the depth of the water.

The apparatus may also be anchored by a plurality of pilings mounted to the bottom of the body of water in a fixed, upright position. The apparatus further has a platform disposed about the shaft. Tubes extend from the underside of the platform and are telescopically connected with the pilings so that the position of the wind turbine relative to the surface of the water is substantially constant regardless of the change in depth of the water. For bodies of water in which the water level does not significantly fluctuate, it is preferred that the apparatus be anchored by a heavy weight and a submerged buoyancy system to maintain the upright vertical position.

A wind turbine apparatus or photovoltaic array and battery bank system may also be employed to compress air. The compressed air is supplied via a conduit to an aeration diffuser heads disposed below the surface of the water. In some embodiments, the compressor is powered by a solar array which is installed on the land. A plurality of aeration heads is employed to distribute compressed air and circulate and oxygenate the water below the surface of the water. The aeration heads have openings, flow-controlling orifices, which are dimensioned to maintain pressure throughout the compressed air supply conduit regardless of distance or depth of diffuser, to ensure equal airflow to all diffuser elements.

BRIEF DESCRIPTION OF THE DRAWINGS

FIG. 6A is a schematic view, partly in diagram form, illustrating the effects of the wind which creates a cylindrical circulation pattern at the surface which can be observed by Langmuir streaks in the body of water, together with an installed wind turbine circulator which transmits wind-induced circulation energy deeper into the water body;

FIG. 6B is a schematic view, partly in diagram form, of another embodiment of a wind turbine circulator employing impellers for both updraft and downdraft pumping and mixing of selected depth strata;

FIGS. 7A, 7B and 7C are schematic elevational views of three submerged buoyancy modules with wind turbine circulators, partly in diagram form, as installed in a body of water, with or without a conduit chamber for vertical conveyance of pumped water;

FIGS. 8A, 8B, 8C, 8D and 8E and are elevational installed views, partly in schematic and partly in diagram form, illustrating various embodiments of a wind turbine circulator/aerator as installed in a body of water with combinations of wind and solar powered shaft circulation and diffused aeration by produced compressed air;

FIG. 9 is a schematic diagram of a wind turbine circulator illustrating possible propeller/impeller system configurations with respect to pitch, rotation and angle which can be employed in the various wind turbine circulators and circulator/aerators to accomplish updraft or downdraft pumping and horizontal mixing and circulation;

FIGS. 9A and 9B are each a schematic diagram of a single propeller/impeller;

FIGS. 9C-9F are two cooperative propellers/impellers sharing various pitches and rotations;

FIG. 14A is a side elevational view and an associated cross-sectional view, partly in schematic and partly in diagram form, illustrating a pneumatic diffuser which is employed in conjunction with the wind turbine circulator and aerator;

FIGS. 15A-15F illustrate various applications for employing a pneumatic diffuser;

FIG. 16 is a schematic view of a diffuser and diffusing system which may be employed in conjunction with various circulators and aerators;

FIG. 17 is a schematic view illustrating a flow restricting size control of the amount of air delivered to a diffuser limit of FIG. 16;

DETAILED DESCRIPTION

Figure 4:
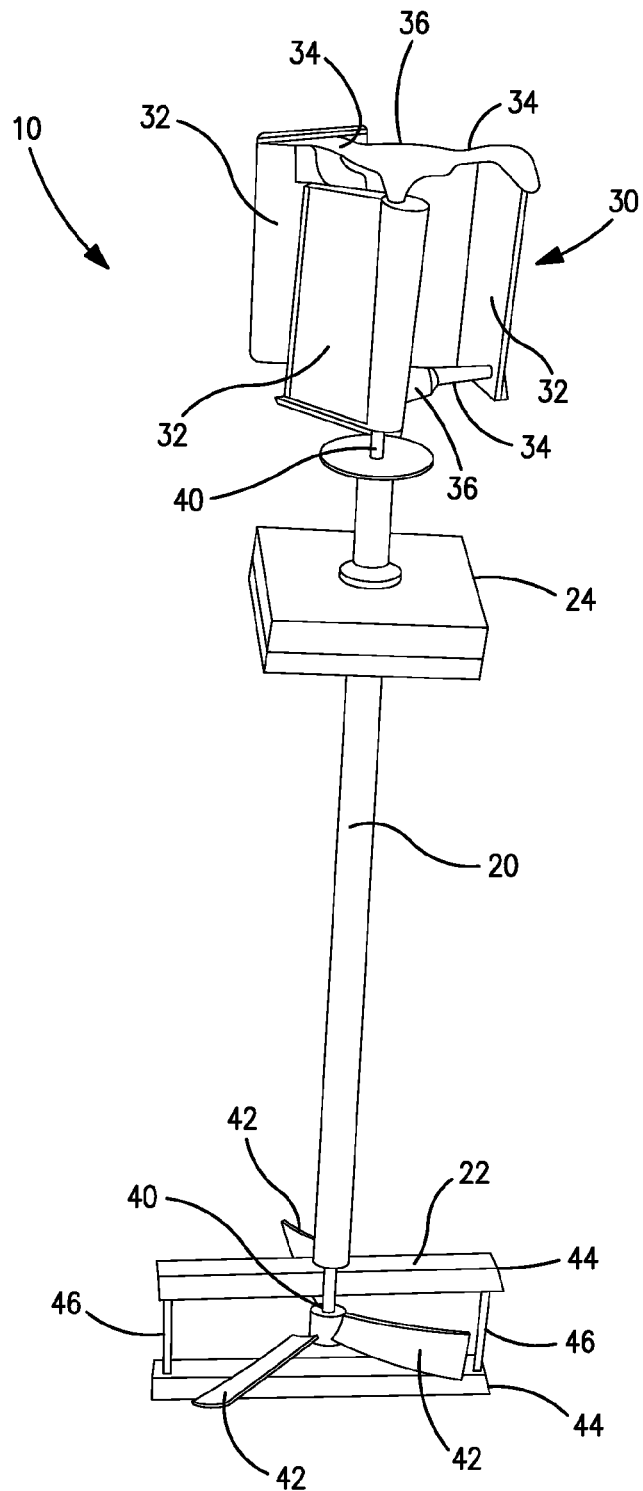
FIG. 4 is a perspective elevational view of a wind turbine circulator.

With reference to the drawings wherein like numerals represent like parts throughout the several figures, a wind turbine circulator is designated generally by the numeral 10 in FIG. 4. The wind turbine circulator 10 is self-powered and functions to circulate water in bodies of water so as to achieve mixing between selected depth layers.

As described herein, various types of circulators and circulator/aerators can be deployed for enhancing the water quality for bodies of water, such as reservoirs and lakes. Wind turbine circulators and wind turbine circulator/aerators are specifically adapted and installed to provide several functions, such as mixing and circulation of a specified depth range to create an aerobic layer bounded by functional thermoclines above and below the layer; downward expansion of the epilimnic mixed layer and associated downward transport of oxygen; and the downward transport of oxygenated water to the deep hypolimnic strata to offset demand. The circulators and circulator/aerators preferably do not require auxiliary power, but are powered by wind and solar energy and a combination of wind powered drives and solar panel produced energy.

Figure 1:
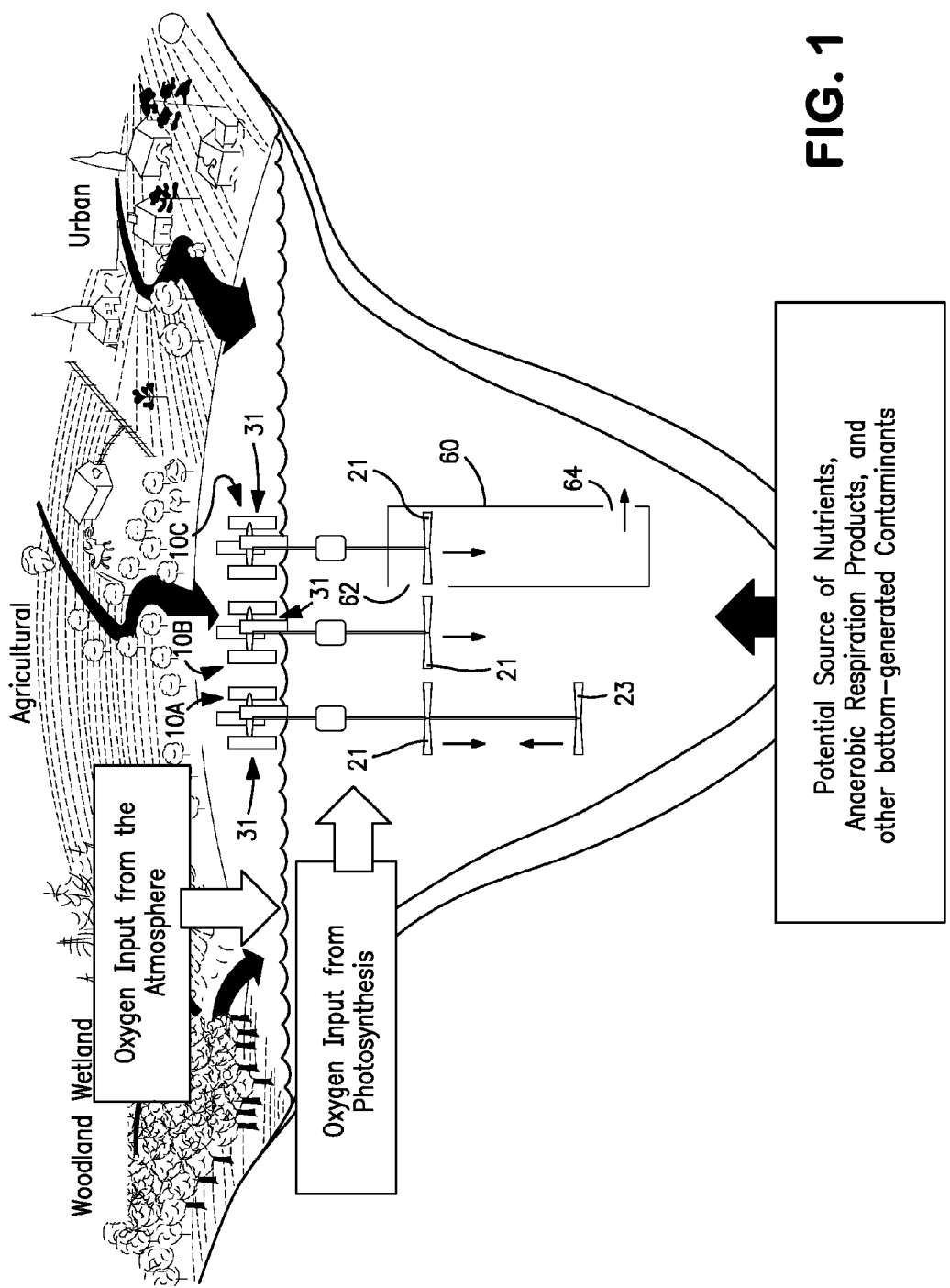
FIG. 1 is a schematic view of a body of water and its surrounding environment, partly in diagram form, further illustrating three embodiments of a wind turbine circulator/aerator installed in the body of water.
Figure 2A:
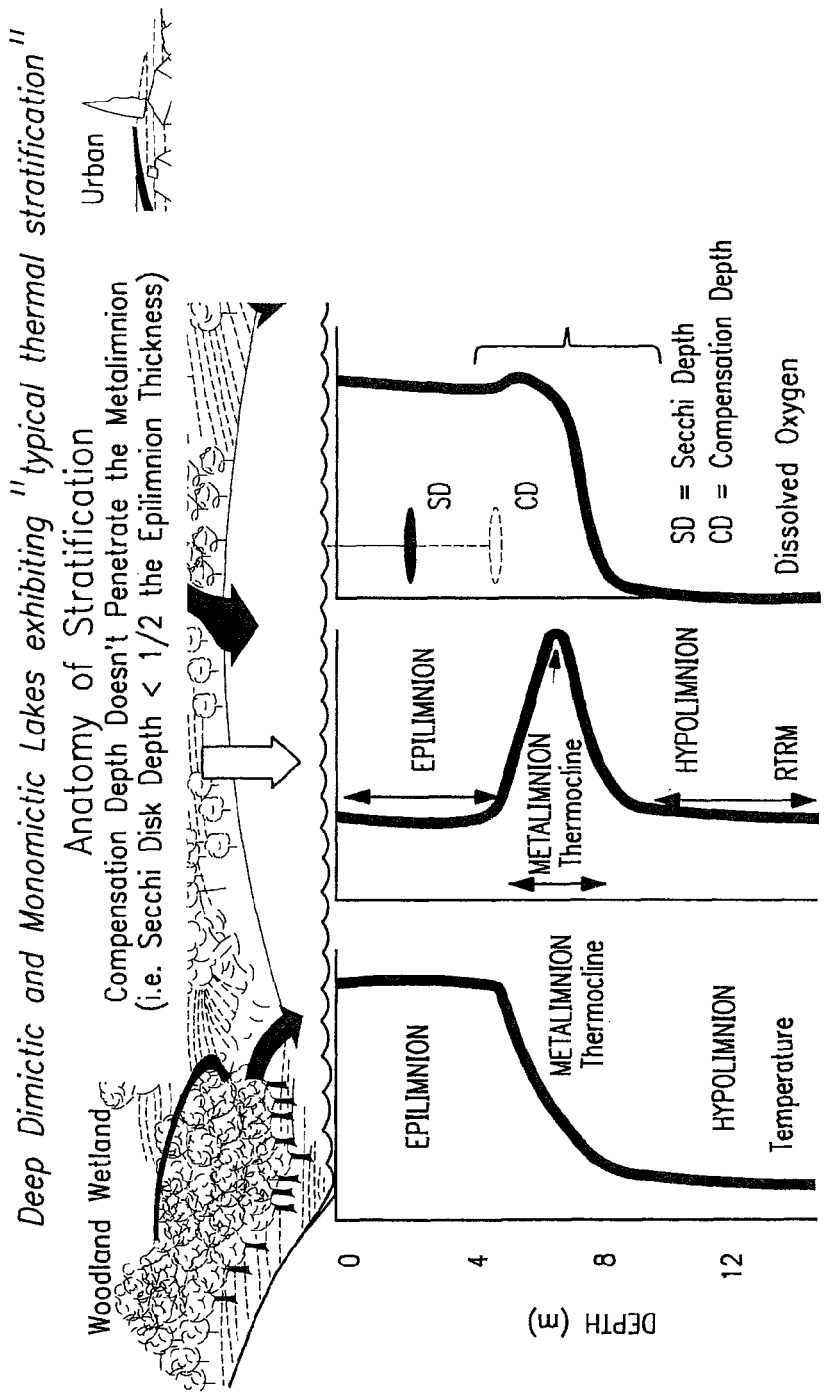
FIG. 2A is a schematic view, partly in diagram form, of a body of water and its surrounding environment further illustrating depth profiles of temperature, RTRM and dissolved oxygen for epilimnion, metalimnion, and hypolimnion layers of the body of water
Figure 2B:
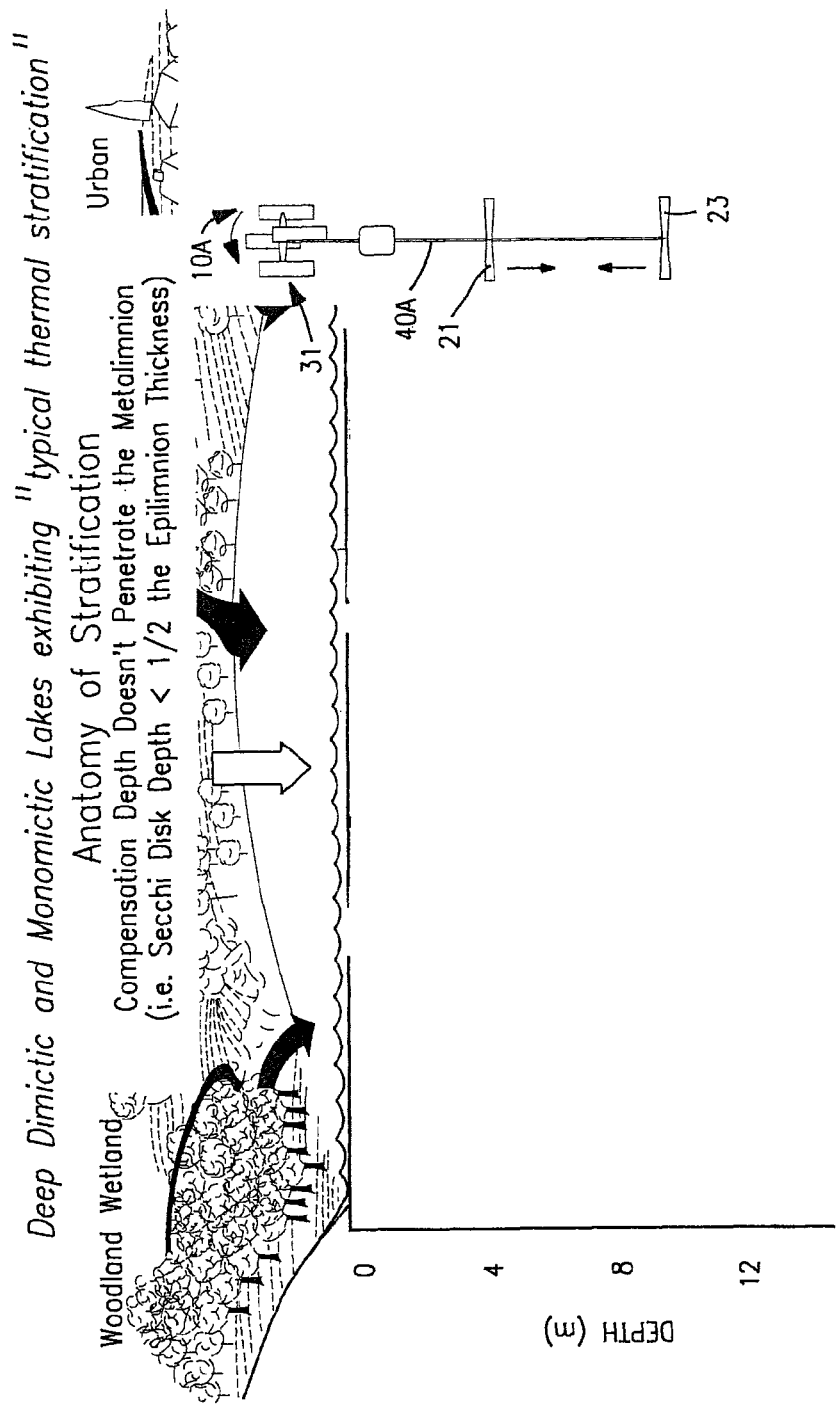
FIGS. 2B-2E are four embodiments of a wind turbine circulator/aerator as installed and operational in connection with the depth profile for a deep lake-type body of water.
Figure 2C:
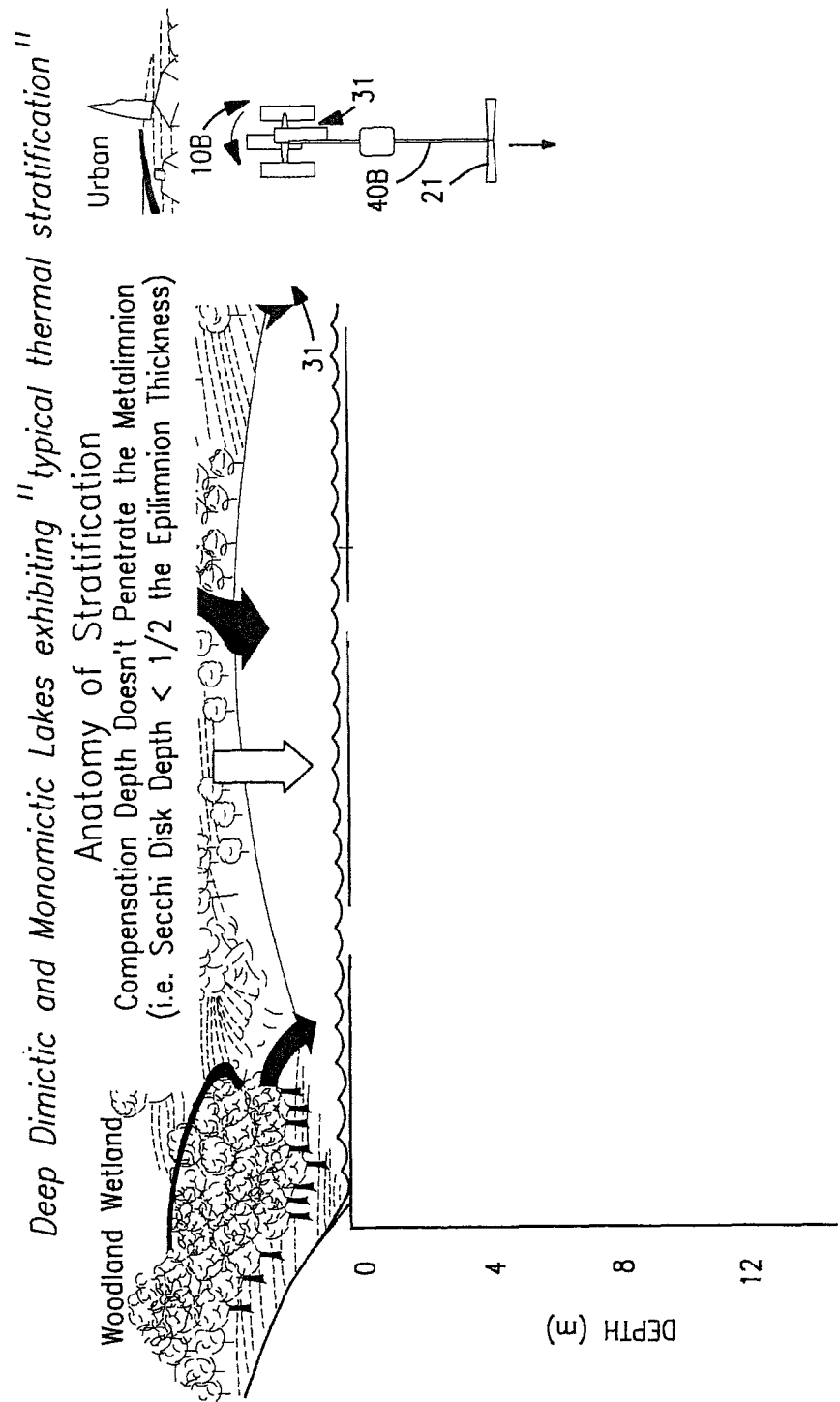
Figure 2D:
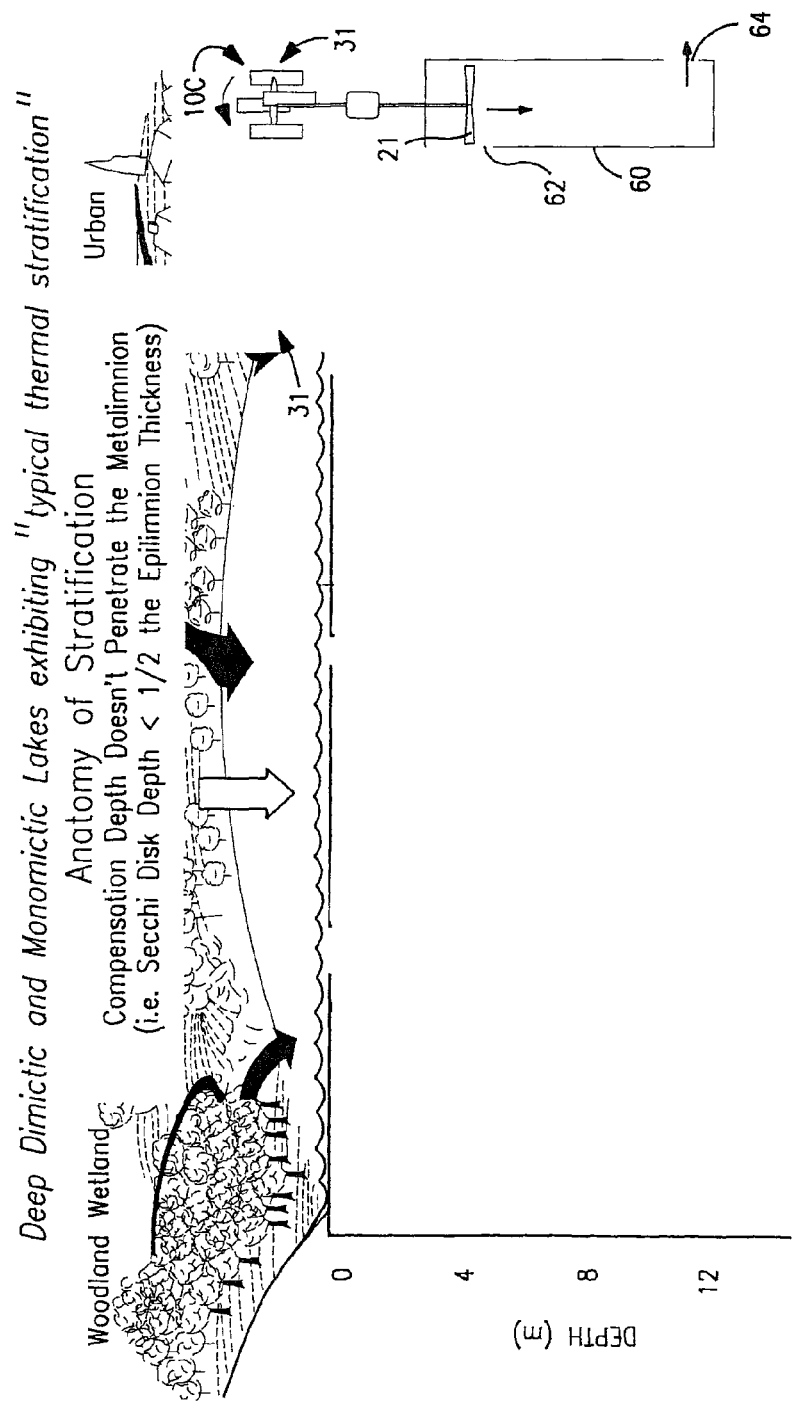
Figure 2E:
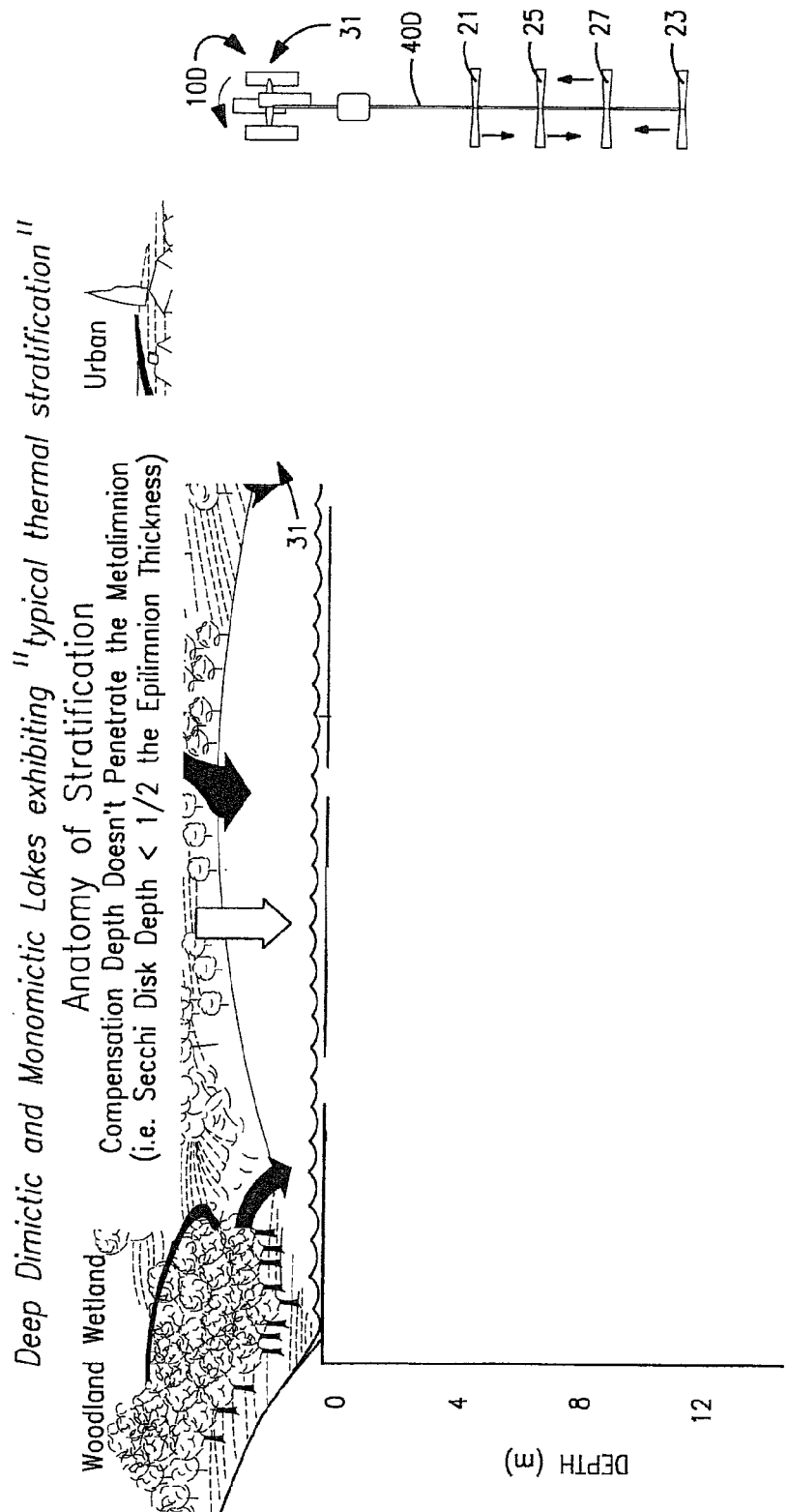

In a body of water to which the wind turbine circulators and circulator/aerators of the present disclosure have particular applicability, the body of water receives oxygen from the atmosphere as well as oxygen available at some depths from photosynthesis. As schematically illustrated in FIG. 1, there is a potential source of nutrients, anaerobic respiration products and other bottom generated contaminants which are introduced from the bottom into the body of water when dissolved oxygen is depleted. For most applications which benefit from enhanced circulation or aeration of deep or shallow water bodies, it is preferred to enhance circulation in a downward direction or within a specified depth strata while maintaining a stratified condition. The latter is preferred in order to minimize the adverse impact of up-welling nutrients, and anaerobic respiration products, such as iron and manganese, and other bottom generated contaminants.

The heavy black arrows in FIGS. 1-3 and 19 represent general induced water flow direction.

Wind turbine circulator 10 illustrated in FIG. 4 is highly efficient and is self-powered from the surrounding environmental forces. A support tube 20 connects an impeller unit 22 and extends through a buoyancy module 24 to upwardly support a wind turbine 30. Upon installation, the turbine 30 is rotatable about a vertical axis and is positioned above the surface of the body of water. The turbine 30 includes a plurality of wind sails 32 which are generally equidistantly mounted by a pair of axially (vertically) spaced mounting brackets 34 extending from a central hub 36.

There is a variety of specific wind turbine engines which are suitable to spin the shaft, including a three wing design, Savonius "scoop-type" design, Giromill, Darrieus, Helical, Lenz Wing and turbines such as those used for roof ventilation. Alternatively, the turbine could be a horizontal turbine, like a windmill, using a 90° gearbox to turn the vertical shaft. A shaft 40 is connected to the wind turbine for rotation about a vertical axis. The shaft 40 extends through the support tube to fixedly couple with the impeller unit 22 to rotatably drive the impeller unit 22. The impeller unit 22 includes a plurality of impeller prop blades 42. The impeller unit is housed within a protective cage formed by a pair of spaced plates 44 and axial struts 46.

Upon proper installation, the wind turbine circulator 10 is installed upright in the body of water so that the wind turbine 30 is positioned above the surface of the water, and the impeller unit 22 is positioned at a selected depth to provide for circulation of the water. The wind turbine circulator is stabilized by the buoyancy module 24. The module 24 stabilizes the wind turbine circulator in an upright relatively stable position wherein the impeller unit 22 is positioned at a generally direct location below the surface of the water to generate the desired water circulation.

As schematically illustrated in FIGS. 1 and 2, various wind turbine circulators are designated as 10A, 10B, 10C and 10D. Circulator 10A includes an elongated shaft 40A which mounts and rotatably drives a pair of axially spaced impeller units 21 and 23. The impeller units are configured and mounted for providing concurrently a downward directional circulation and an upward circulation. It should be appreciated that as the wind turbines rotate due to the environmental wind currents above the surface of the water, the impellers also rotate due to the fixed rotational relationships between the impeller units 21, 23, 25 and 27 and the wind turbine.

Wind turbine circulator 10B includes a single impeller unit 21 which essentially provides for a downward circulation. For the wind turbine circulator 10B illustrated in FIG. 2, the length of the shaft 40B is longer and the impeller 21 is configured to provide a downward direction to circulate the water and transport ambient dissolved oxygen from more shallow aerobic strata to deeper depths.

Wind turbine circulator 10C includes a cylindrical chamber 60 which is mounted to the support post and includes an upper intake port 62 and a lower output port 64. The impeller unit 21 is housed within the chamber 60 and functions to provide a downward circulation through the lower output port 64, as best illustrated in FIGS. 1 and 2. Wind turbine circulator 10C is employed to provide downward transport of oxygenated water to the deep hypolimnetic strata to offset the demand.

For the wind turbine circulator 10D illustrated in FIG. 2, a multiplicity of impeller units 21, 23, 25 and 27 are employed. Impeller unit 21 provides a downward circulation. Impeller units 25 and 27 cooperate to provide intermediate downward and upward circulations. Impeller unit 23 provides an upward circulation to mix in circulating water.

A preferred application of the wind turbine circulators 10A, 10B, 10C and 10D may be appreciated by reference to FIG. 2. Wind turbine circulator 10A is employed to provide mixing circulation at a specified depth range to create an aerobic layer bounded by the upper and lower functional thermoclines. Wind turbine circulator 10B provides a downward expansion of the epilimnetic surface layer and associated downward transport of dissolved oxygen.

Figure 3:
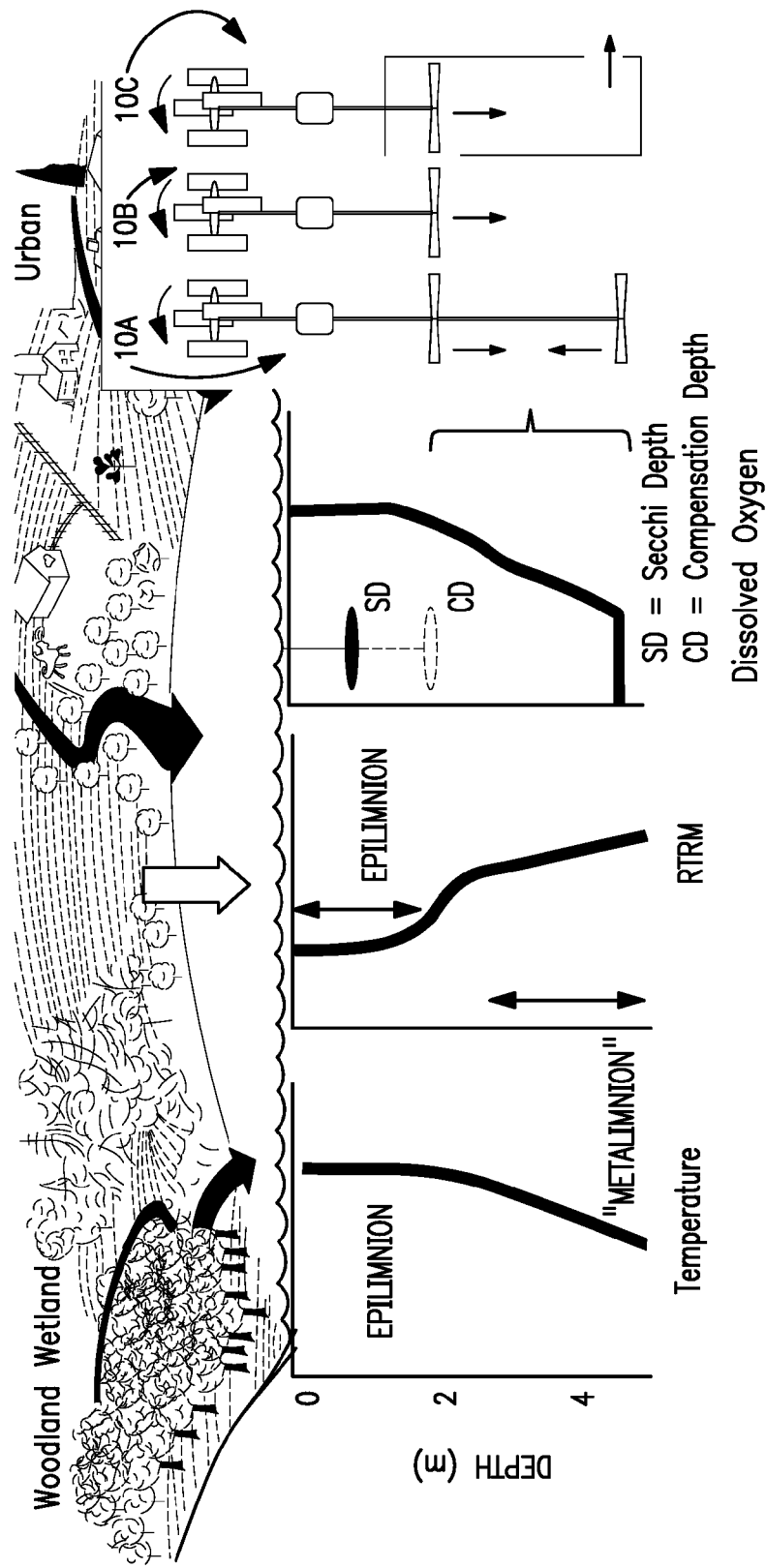
FIG. 3 is a schematic view, partly in diagram form, of a body of water and its surrounding environment further illustrating depth profiles of temperature, RTRM and dissolved oxygen for depth layers of the body of water together with three embodiments of a wind circulator/aerator as installed and operating with the depth profile for a shallow lake-type body of water.

The wind turbine circulators 10A, 10B and 10C can also be employed, as best illustrated in FIG. 3, in shallow lakes and other water bodies which exhibit intermittent stratification and/or a very high demand for dissolved oxygen. It will be appreciated that in this type of water body, the oxygen consumption in deeper strata and oxygen demands at the sediment water interface can exceed the oxygen replenishment rate from the atmosphere and photosynthetic production near the surface. Consequently, wind turbine circulator 10A can be employed to provide a mixing circulation at a specified depth to increase oxygen delivery to the bottom. Turbine 10C is employed to produce a downward transport of oxygenated water to the bottom waters to offset the high sediment oxygen demand.

Figure 5A:
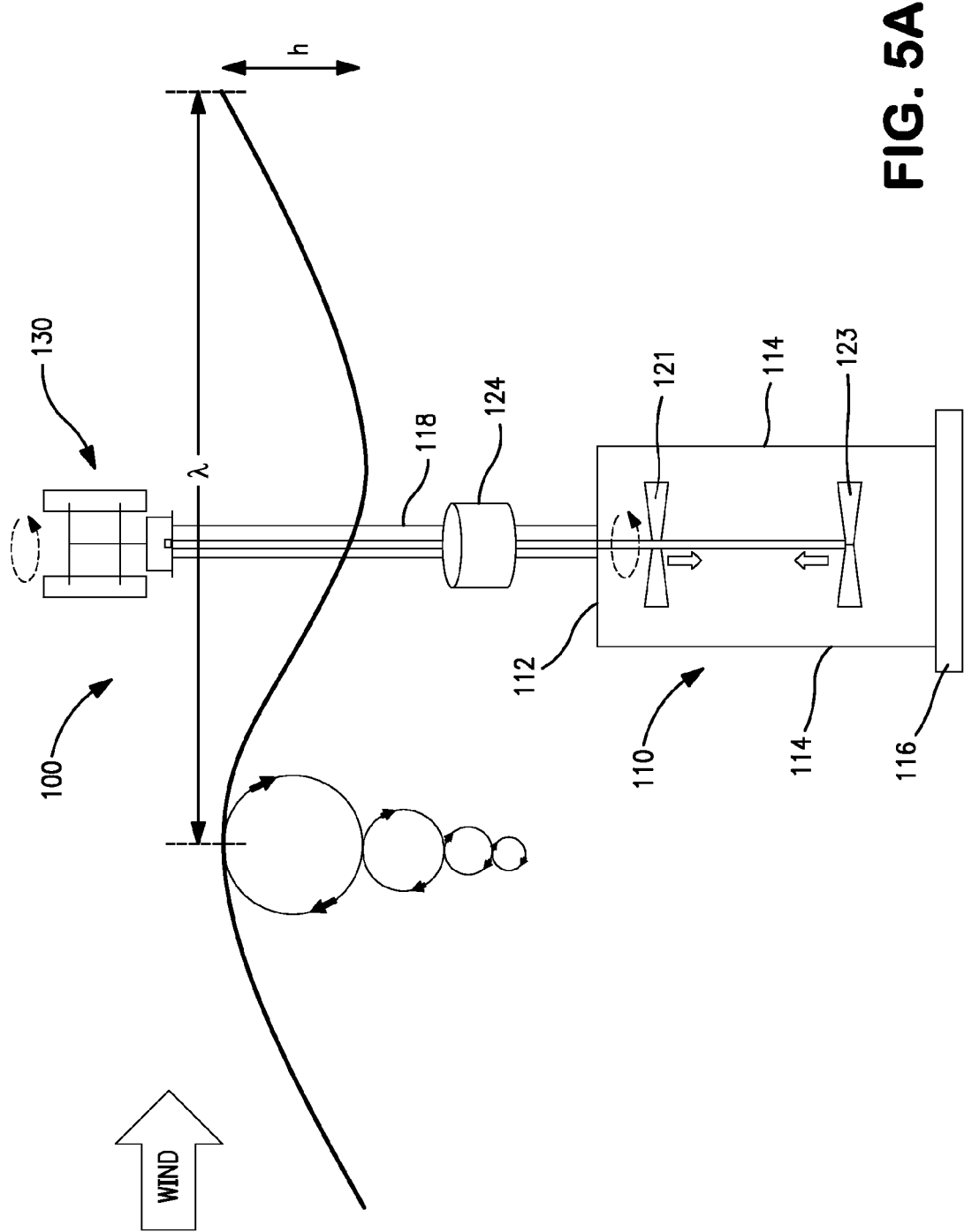
FIG. 5A is an elevational schematic view, partly in diagram form, illustrating a submerged buoy erect piling mooring system for a wind turbine circulator and further illustrating a submerged buoyancy installation approach.

A wind turbine circulator and/or wind turbine circulator aerator may be subject to significant damage from wave action across the body of water, especially during major storms. Consequently, for some embodiments, it is required that the structures be sufficiently anchored and adapted to alleviate the adverse effects of wave action. As illustrated in FIG. 5A, the wind produces a representative wave height h and a wave length $\lambda$ across the body of water.

Wind turbine circulator 100 employs a submerged buoyancy piling and mooring system 110, as illustrated in FIG. 5A. The buoyancy module 124 is sufficiently submerged below the surface of the water so that it will not be exposed to significant wave-induced oscillations. A pair of impeller units 121, 123 produces a cooperative downward and upward circulation below a platform 112. The platform is anchored at the bottom of the body of water. The anchoring may be provided by vertical pipes 114 secured to an anchor base 116 as illustrated or by a cable/chain mooring-type system. Alternatively, the anchoring connection can be provided by ropes, cables, chains and other solid connectors.

A tubular support post 118 extends from the impeller module through the water surface where it mounts the wind turbine 130. A rotatable drive shaft 140 is housed in the pipe 130. The wind turbine rotates the shaft 140 which directly drives the impellers. The buoyancy module 124 which is mounted below the surface of the water maintains the pipe 130 and the shaft 140 in a substantially erect vertical position. The anchor weight of the anchor base 116 has a ballast counterweight that is significantly greater than the buoyancy of the buoyancy module 124. For wind turbine circulator 100, the module 124 principally functions to maintain the vertical position of the surface structures.

Figures 5B, 5C:
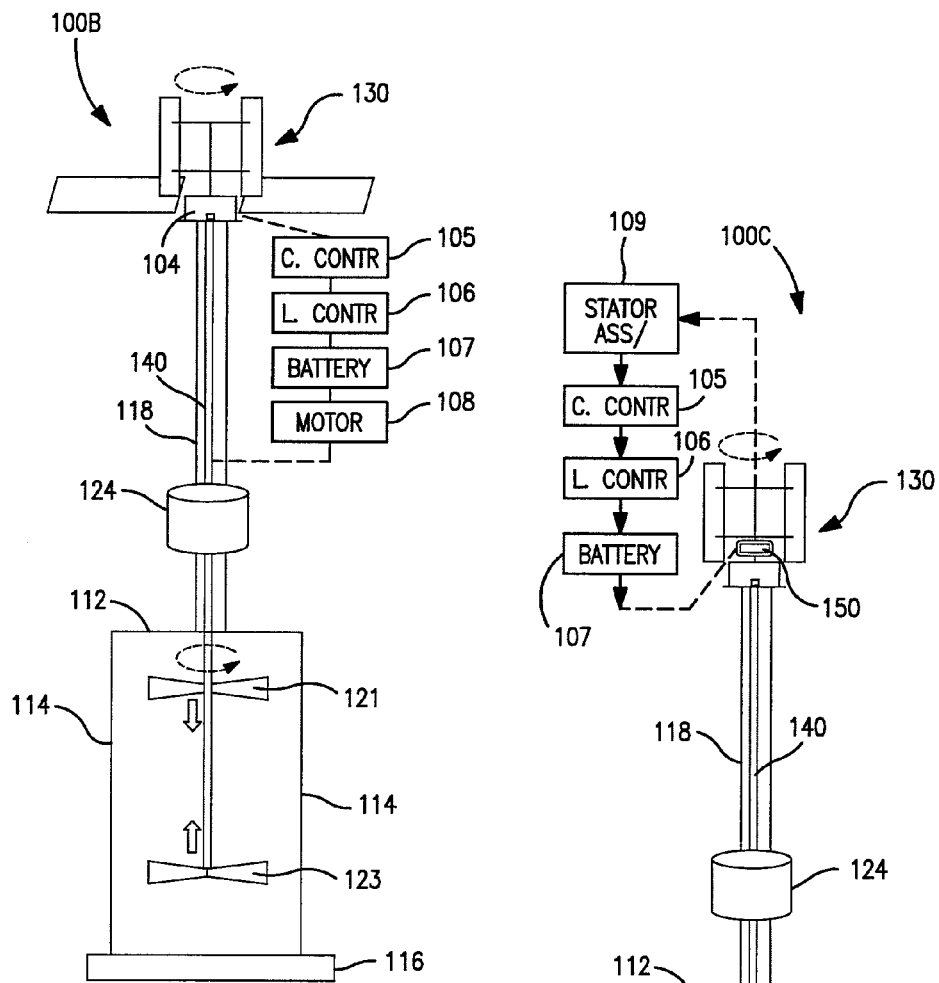
FIG. 5B is an elevational schematic view, partly in diagram form, illustrating another embodiment for a wind turbine circulator which also includes a solar voltaic array and associated equipment and further illustrating a submerged buoyancy installation approach.
FIG. 5C is an elevational schematic view, partly in diagram form, illustrating another embodiment for a wind turbine circulator and a wind powered electrical generator apparatus.

Alternatively, a hybrid solar wind powered circulator 100B illustrated in FIG. 5B employs a solar/photovoltaic array and associated equipment disposed in a housing module 104 (schematically shown). The apparatus includes a charge controller 105, a load controller 106 and a battery system 107. The battery system drives a DC or, if inverted, an AC, motor 108 or compressor system. The motor rotates the shaft to provide both air lifting and pumping as well as aeration of the impeller units during calm intervals.

Another embodiment in the form of a hybrid wind generator powered apparatus 100C is illustrated in FIG. 5C. This embodiment includes an alternator stator assembly 109 which generates electricity. A charge controller 105, load controller 106 and battery system 107 drives a DC motor compressor 150 to again provide airlifting, pumping or aeration of the apparatus during calm intervals when the wind is not sufficient to otherwise rotate the impellers and provide sufficient aeration.

Wind across the body of water also does produce circulation and mixing in the form of horizontal cylindrical water columns. These columns result in observed Langmuir streaks on the surface, as illustrated in FIGS. 6A-6C. As illustrated, the convergence of these columns produce divergent upwelling currents and convergent downwelling currents. A wind turbine circulator 200 employs a plurality of impeller elements 221, which may have either a clockwise or counterclockwise pumping direction, to capture the wind energy and transmit it vertically down into the water to extend the depth of the wind induced mixing.

As best illustrated in FIG. 6B, wind turbine 200B employs impeller units 221 and 223 configured to provide opposing clockwise rotations so that a blended layer or circulated layer is formed. In addition, only downward impellers (not illustrated) may be located to provide downward mixing for conditions wherein the bottom surface serves as a barrier to the downward circulation.

The wind turbine circulator 200C illustrated in FIG. 6C employs a conduit 260 with a lower, nozzle-like peripheral outlet 264 which is restricted. The circulated water in the conduit is pumped or downwardly forced from a relatively shallow depth through the conduit 260 to mix and be forced through outlet 264 into the deep cold hypolymnium. A Venturi-type eduction of the outflow induces blending with deep water.

Figure 6D:
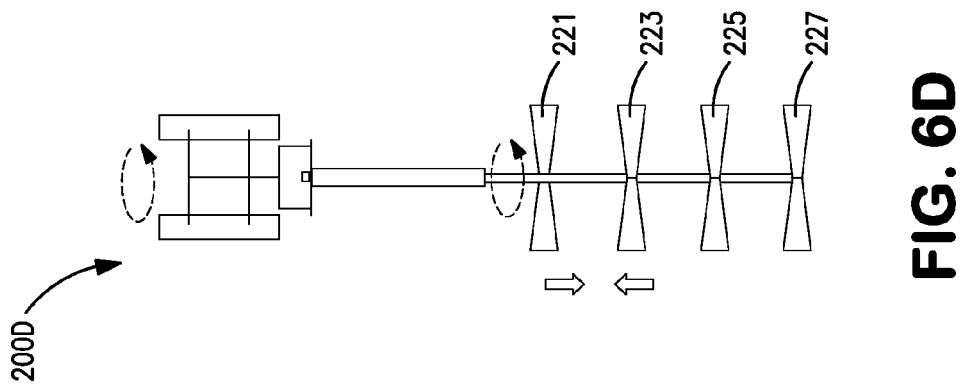
FIG. 6D is a schematic view, partly in diagram form, of another embodiment of a wind turbine circulator employing multiple impeller elements which can be deployed in any combination of updraft or downdraft direction.
Figure 6C:
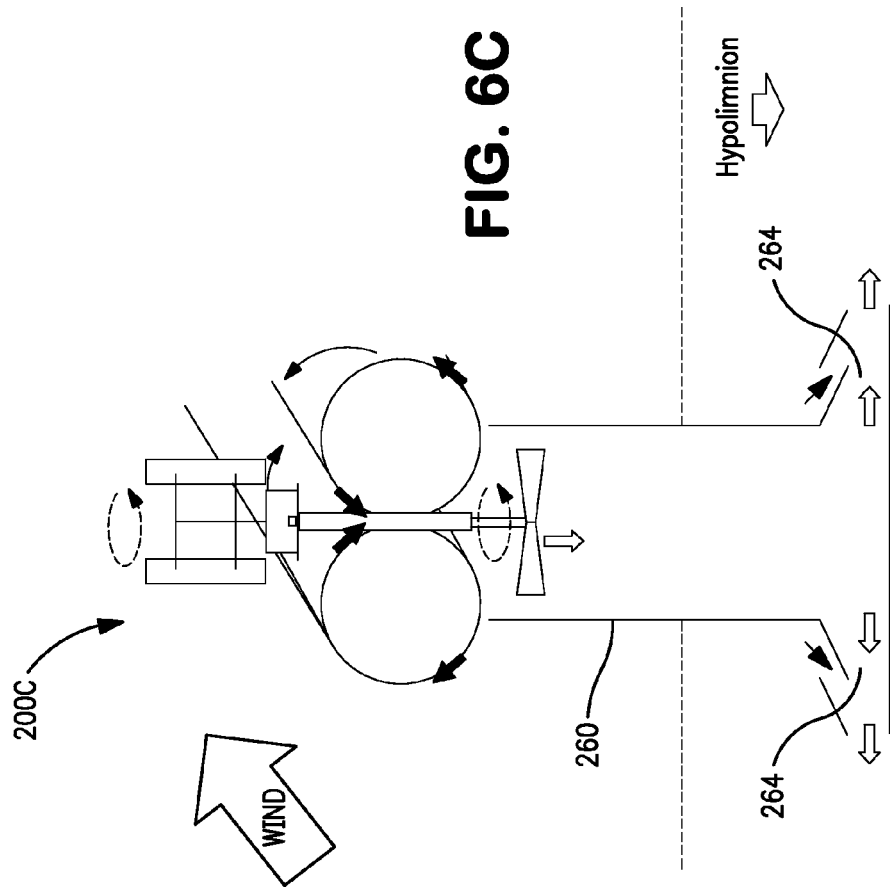
FIG. 6C is a schematic view, partly in diagram form, further illustrating another embodiment of a wind turbine circulator to pump circulated aerated water downward through a conduit and blending into a deep, cold hypolimnion layer.

The wind turbine circulator 200D illustrated in FIG. 6D employs multiple impeller units 221, 223, 225 and 227 to achieve the desired mixing and layering.

The vertical axis wind turbine circulator for a submerged buoyancy module may be configured in a number of circulation configurations with respect to the water level was illustrated in FIGS. 7A-7C. Wind turbine circulator 110 employs a pair of impeller units 121A, 123A which provide concurrent upward and downward pumping or circulation. The circulator is anchored to a base 116A at the bottom of the water body.

Wind turbine circulator 110B employs a cylindrical chamber 160B which surrounds the impeller units 121A, 123A and has an upper and a lower inlet port 161B, 163B, respectively, and an intermediate outlet port 164B. The impellers are configured concurrently to provide a downward and an upward circulation.

Wind turbine circulator 110C employs a single impeller 121C which provides a downward circulation path within a chamber 160C. An upper inlet port 162C is provided so that the circulator pumps water downwardly into a lower depth for release through outlet port 164C to provide circulation.

A series of schematic representations illustrating how the capabilities of a circulator 300 may be enhanced by various wind and solar dependent modules for conditions wherein the wind is greater than five miles per hour and the sun is greater than five hours direct is illustrated in FIGS. 8A-8E. The circulator configurations are illustrated in relation to water level w. A compressor 350 may be added to provide, for example, 3-4.5 CFM at 30 PSI. In addition, a windmill 370 may be added to provide additional power so that, for example, 6-9 CFM may be produced. In addition, it is possible to provide a supplement of solar direct drive 380 for any of the various configurations.

The propellers for the impeller systems for circulator 300 (and other circulators) can be selectively configured to provide various circulation qualities as required for a given application. This is best illustrated by the charts of FIG. 9. The propeller pitch, e.g., the displacement that the propeller makes in a 360° rotation about the shaft, can be selected to provide for desired torque and vertical axis wind turbine windspeed (VAWTRPM). The rotation of the propeller can be clockwise (CW) or counterclockwise (CCW) rotation. The angle of the propeller (P) can be varied and fixed to focus on more horizontal mixing or more vertical mixing and pumping. Naturally, with multiple propellers, various combinations can be employed to accomplish the desired horizontal and vertical functions.

Another problem that is encountered upon installation of wind turbine circulators in water bodies is that the water bodies themselves may experience significant water level fluctuations ($\Delta w$). The water level fluctuations may be compensated by the schematic illustration of FIG. 10. An anchor 402 is fixedly positioned at the bottom of the body of water. Connecting pulleys 404 are mounted to a flotation platform 406 positioned at the surface of the water 406. A wind turbine circulator 400 is mounted to the flotation platform. A cable 408 connects at one end with the anchor 402 and extends around a pulley 404 at opposed sides of the flotation platform 406. A counterweight 410 is placed on the other end of the cable. Multiple pulleys 404, cables 408 and counterweights 410 are preferably employed.

Figure 10:
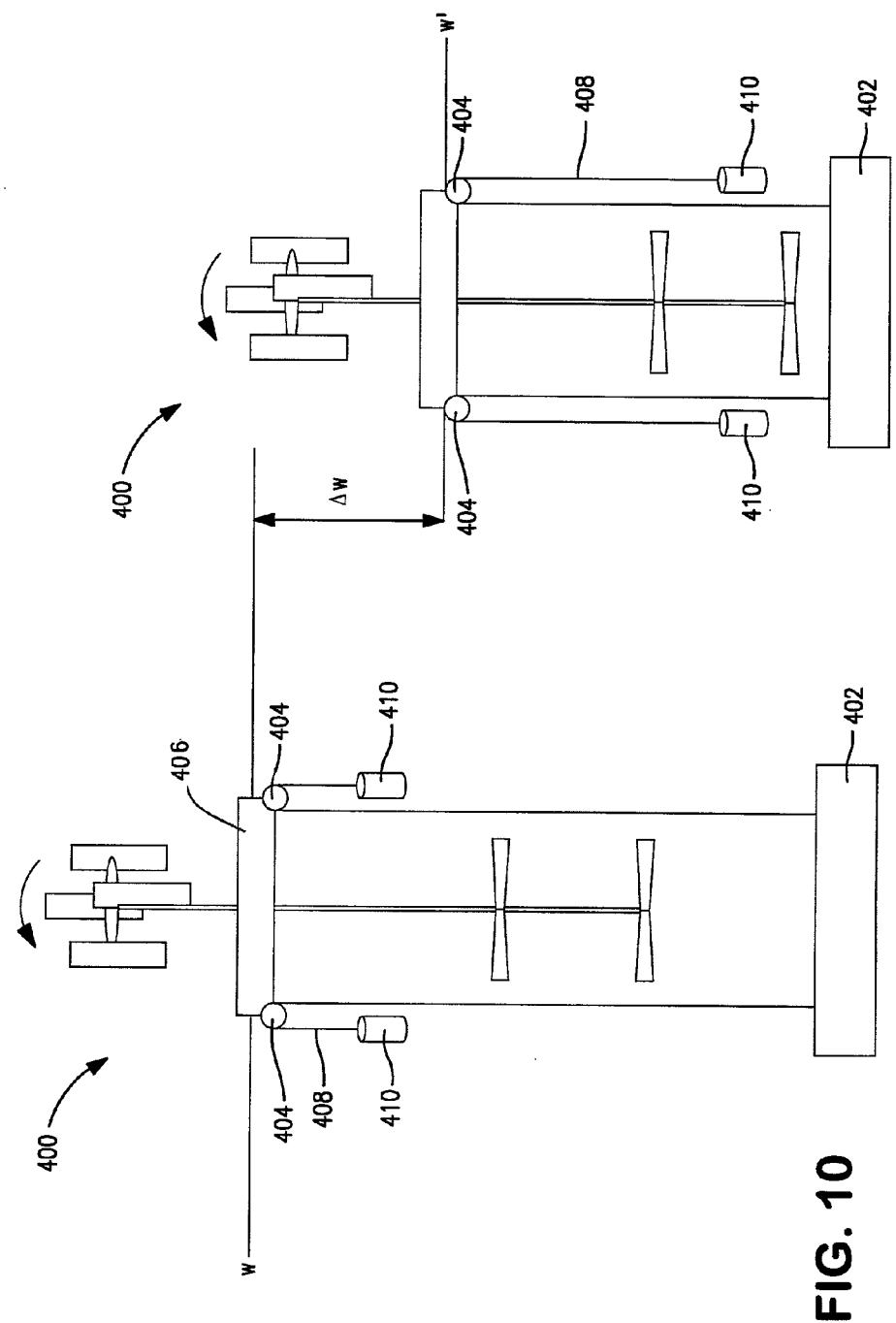

Consequently, as the level of the water changes from w to w', as illustrated in FIG. 10, the pulley system and counterweights function to maintain the proper position of the wind turbine circulator 400 relative to the upper surface of the water.

Figure 11:
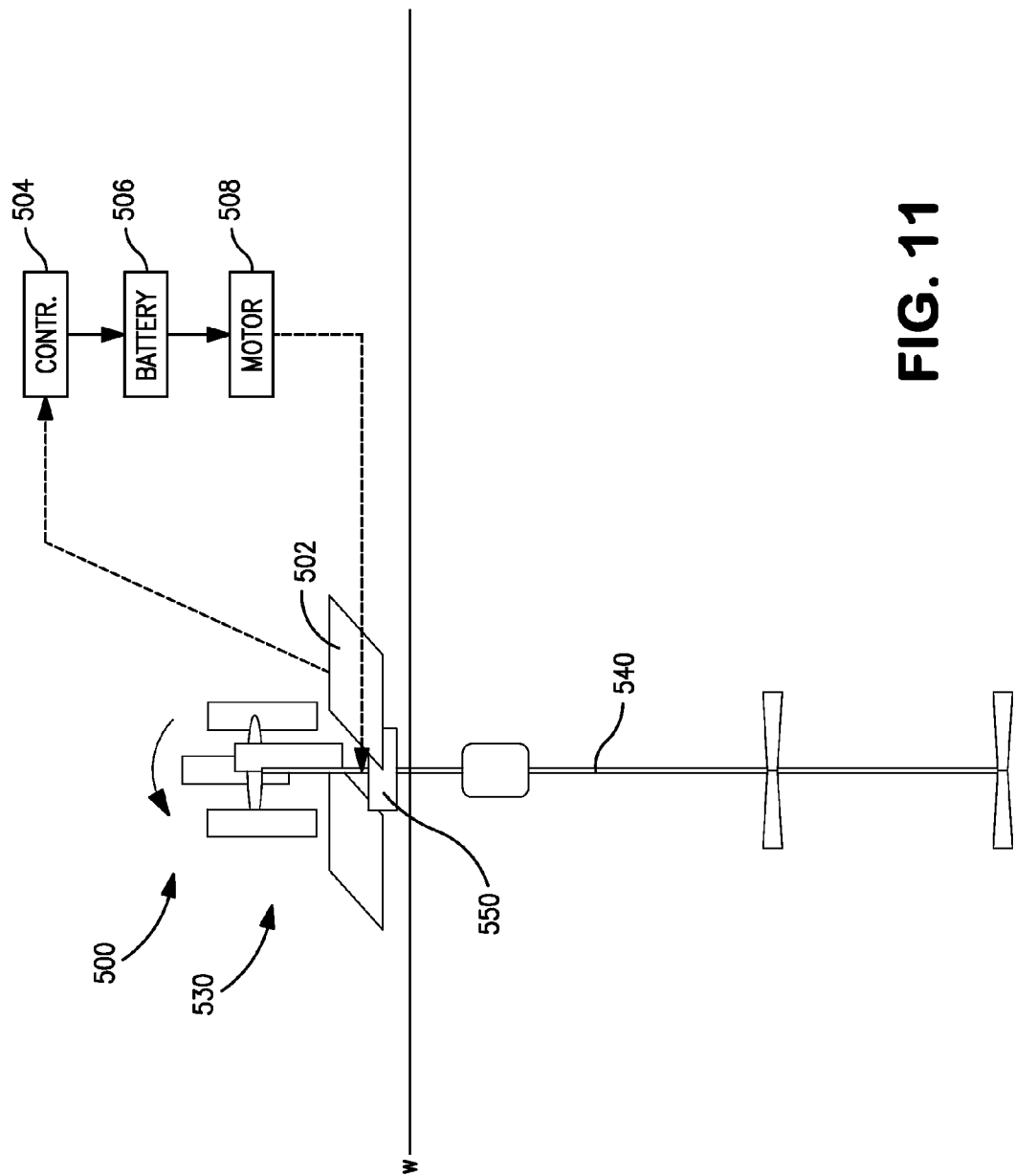

With reference to FIG. 11, wind turbine circulator/aerator 500 employs a direct drive air compressor 550 on the drive shaft 540. The circulator/aerator thus not only circulates the water, but provides for a diffused aeration enhancement through the drive of the wind turbine 530. In addition, the circulator 500 employs a photo voltaic array of solar panels 502 which generate power. A controller 504 and battery pack 506 are employed to power a motor 508. The motor 508 connects to the shaft 540 for driving the shaft and the compressor 550 to provide diffused air enhancement of the wind turbine when the wind velocity is relatively low or insufficient to provide suitable circulation and aeration.

Figure 12:
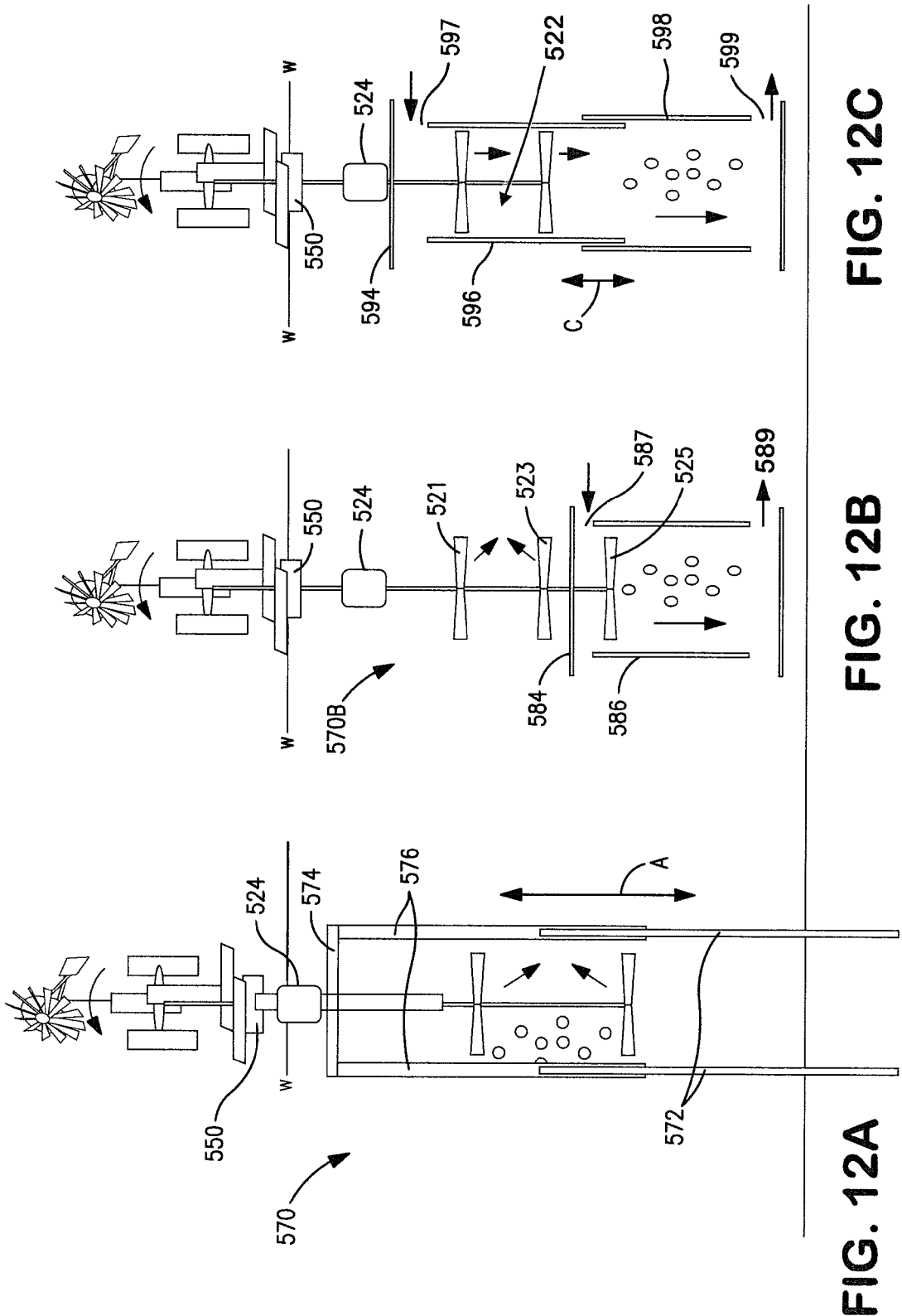
FIG. 12A is an elevational schematic view, partly in diagram form, of a representative wind-solar circulator/aerator as mounted on pipe pilings.
FIG. 12B is an elevational schematic view, partly in diagram form, of a hybrid wind-solar circulator/aerator as installed in a body of water to aerate and circulate several depth strata simultaneously.
FIG. 12C is an elevational schematic view, partly in diagram form, of a hybrid wind-solar circulator/aerator as installed in a body of water and further illustrating a telescopic mount to accommodate fluctuating water levels.

Alternatively, any of the foregoing described wind solar circulation/aerators can be mounted onto pipe piling installations 570 as illustrated in FIG. 12A. Pipes 572 are anchored into the bottom of the water body and extend upwardly. A platform 574 includes downwardly extending parallel tubes 576 which are slidably received over the pipes 572. The tubes 576 telescopically change position as indicated by the arrow A to accommodate the depth changes in surface of the water w. In addition, the pipe/tube assembly provides a very efficient way of removing and installing the circulator or circulator/aerator installations when required for seasonal purposes.

With respect to the anchoring system illustrated in FIG. 12B, the platform 584 is the top of a cylindrical chamber 586. The platform 584 is mounted below a tandem impeller unit 521, 523 and above a third impeller unit 525. Impeller unit 525 is disposed in the chamber 586 which has an input port 587 and an output port 589. Aerated water is preferably forced downwardly out of the output port 589 at the lower portion of the circulator/aerator unit. The chamber may rest on the bottom of the body of water or may be anchored to the bottom.

As best illustrated in FIG. 12C, the platform 594 may also be disposed below the buoyancy module 524. A pair of telescopically received chambers 596, 598 houses a dual impeller unit 522 which forces the water downwardly. The relative position of the lower chamber 598 vis-à-vis the upper chamber 596 which houses the impellers varies is indicated by arrow C. An input port 597 at the upper portion below the platform 594 provides the input opening so that the water is forced to circulate downwardly through chambers 596, 598 and out of the bottom at the outlet port 599. The compressor 550 also provides for oxygenation of the water which is typically warmer as it is circulated through the output port 599 into the generally cooler water level.

Figure 13:
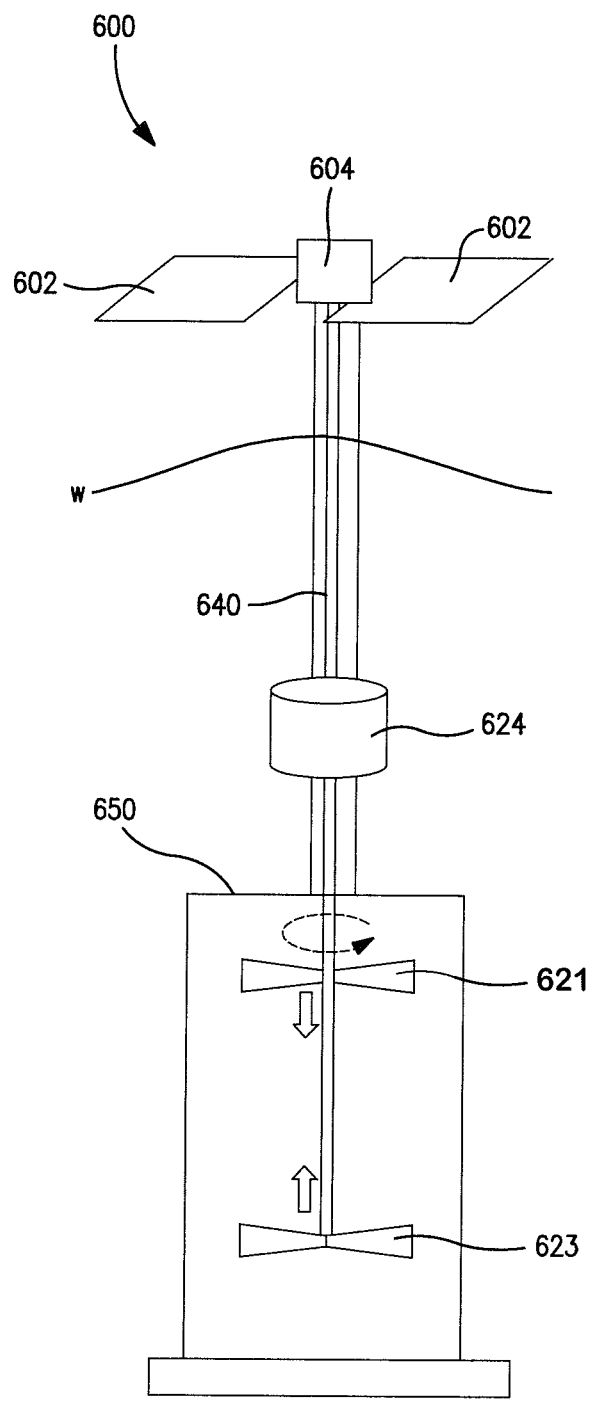
FIG. 13 is an elevational installation view, partly in schematic and partly in diagram form, illustrating a solar powered circulator as installed in a water body.

As additionally illustrated in FIG. 13, the power for water circulator 600 may also be solely provided by a solar array 602. The solar array 602 provides power for a motor disposed in housing 604. The motor drives the shaft 640. In the illustrated embodiment, impeller units 621 and 623 are disposed below a platform 650 which is anchored to the bottom floor of the body of water. The buoyancy module 624 functions to keep the circulator in a generally upright orientation.

A pneumatic impeller diffuser 700 can be driven by compressed air to induce a circulation current and solute phase oxygen input from diffused air, as best illustrated in FIGS. 14 and 14A. A housing 710 has a pair of bearings 712, 714 for mounting about a central rotatable shaft 740 having a communication channel 742. The housing 710 forms a chamber 730 with an inlet 732 and an outlet 734. Inner pump rotor 750 rotatable in the chamber 730 has reciprocating vanes 752, 754, 756, 758 which utilizes the expansion of compressed air to rotate the shaft and impeller. Release of exhausted air is jetted directionally to enhance impeller spin.

The air flows in the path as indicated by the arrows through the channel 742 to the impellers 720 and radially from the impellers for exit through ports 722, 724 in the impellers. As the drive shaft 740 rotates, the air is forced axially and then radially from the impellers into the water as the impellers also rotate. As further illustrated, the pneumatic diffuser 700 can be deployed for rotation in any direction and is easily coupled to the wind driven shaft of the wind turbine circulator.

The pneumatic diffuser 700 can be employed in a number of ways, as best illustrated in FIGS. 15A-15F. In FIG. 15B, the diffuser is employed in a pump chamber 760 for pumping while dissolving gas and aerating. In FIG. 15D, the diffuser 700 is inverted in the pump chamber 760.

As illustrated in FIG. 15C, a pair of diffusers are employed in a mixing chamber 765 for circulating while dissolving the gas. Either directional rotation may be employed. The diffuser is deployed at the inside of the mixing chamber 765 for downward pumping while dissolving gas, namely, oxygenation contactors. In FIG. 15E, the diffuser 700 is directionally employed as a means of propulsion inside a generally horizontally disposed housing 780. As further illustrated in FIG. 15F, the diffuser 700 may be employed inside an aeration chamber 770 using high pressure/low volume to enhance efficiency of diffused aeration using low pressure/high volume blowers 772.

Figure 19:
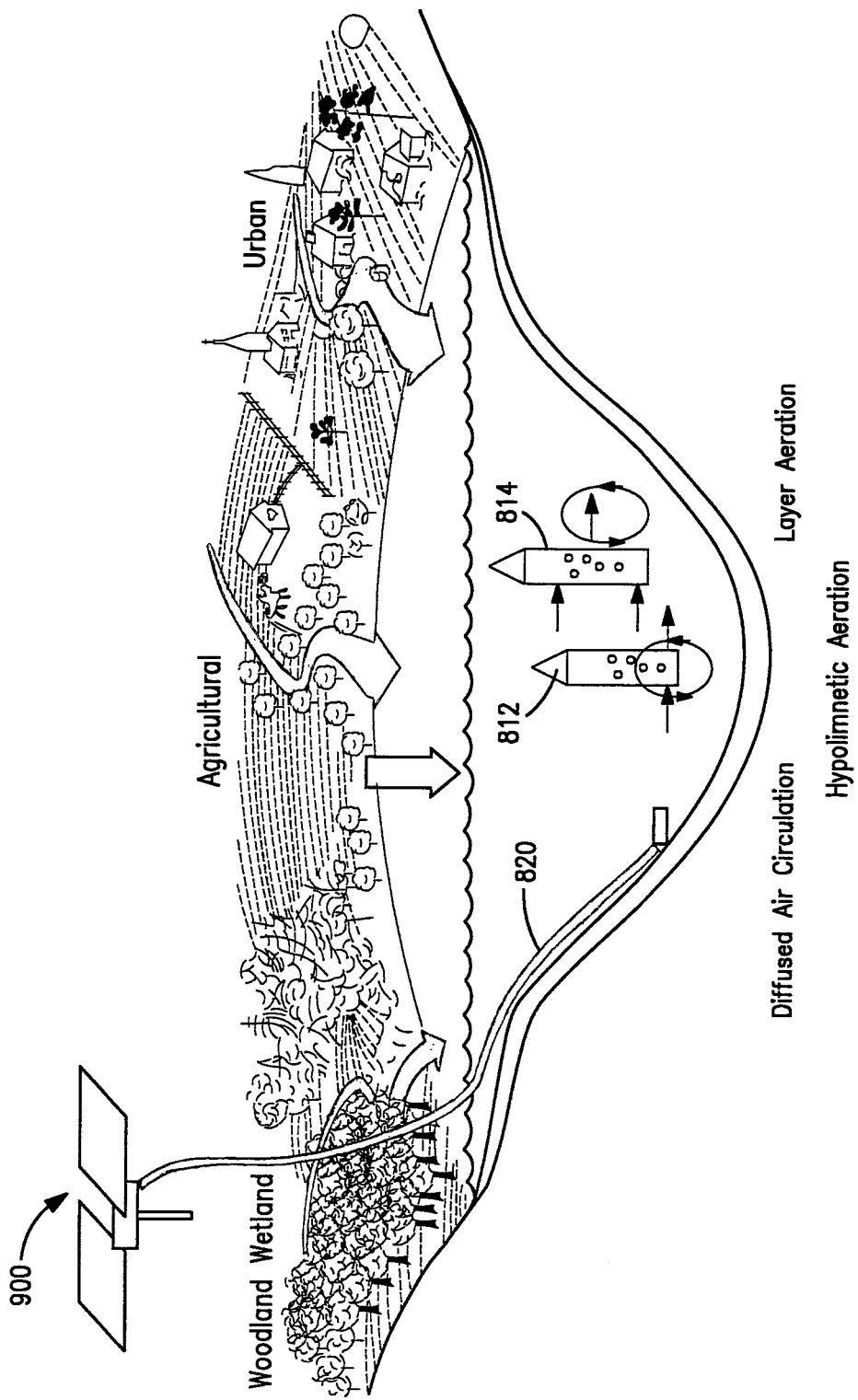
FIG. 19 is a schematic view, partly in diagram form, illustrating a body of water and its surrounding environment and a hybrid wind solar power generator which is land based for a solar power system for three aeration and circulation techniques.

As illustrated in FIGS. 16 and 17, compressed air can be delivered in equal proportions to a plurality of diffuser elements 810 regardless of distance from compressed air source or water depth and pressure. A flow restricting orifice 830 controls the air volume to each diffuser assembly 810. The flow limiting orifice 830 maintains pressure throughout the main feed line 820 so that diffusers can operate with an even airflow in terms of CFM distribution regardless of the pipe length and depth. By controlling airflow in this manner, the entire length of the feed line from the compressor is maintained at a pressure that feeds an equal amount of airflow to each diffuser, regardless of the depth/pressure of distance from the compressor as illustrated in FIG. 19. The diffuser heads may be configured for various internal flow paths as schematically illustrated for heads 812 and 814 in FIG. 19. The multi-diffuser approaches can be deployed with any of the described apparatus and methods that are driven by a diffuser and air-lift pumping, for example, hypolimnetic aerator units, layer aeration units, and design depth circulators.

Figure 18:
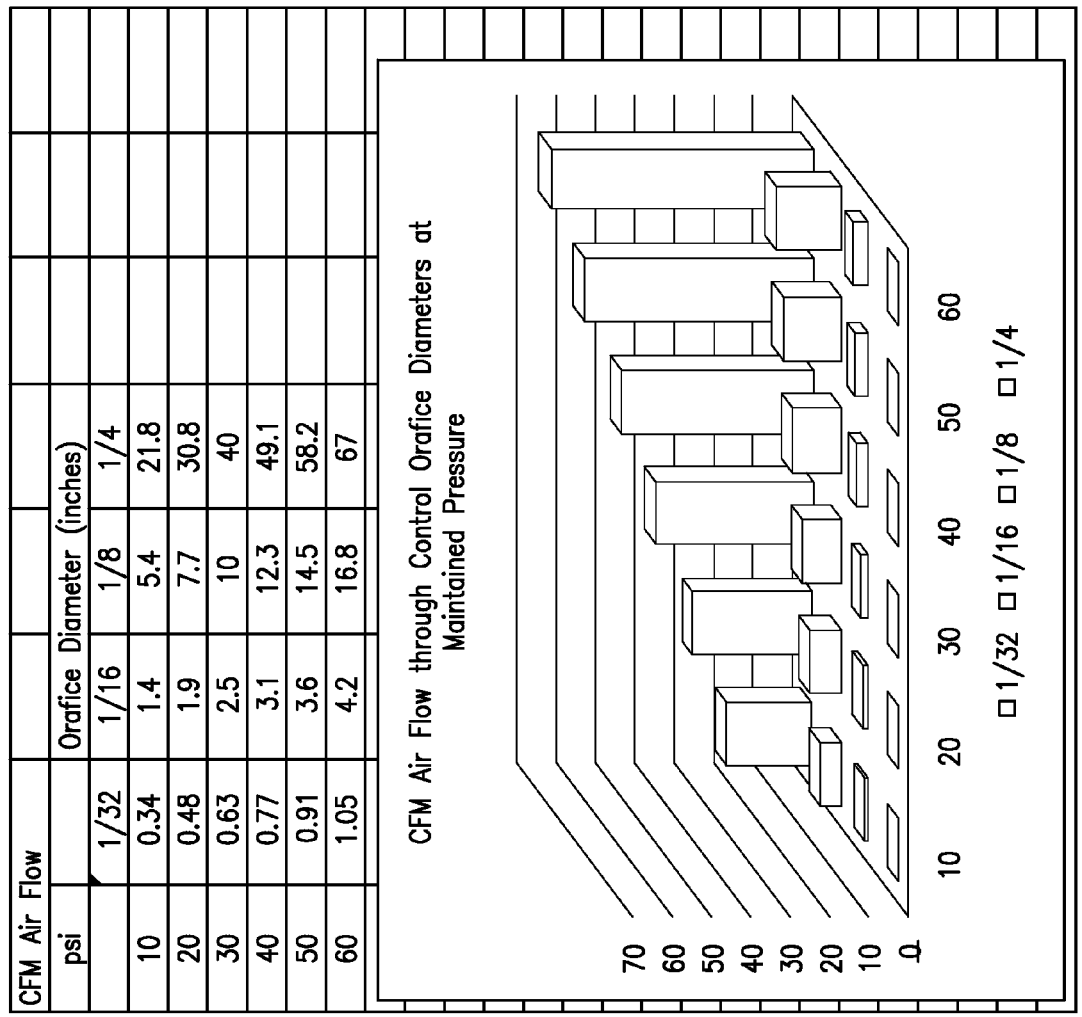
FIG. 18 is a chart illustrating how flow restricting orifices control the amount of air delivered to the diffuser units of FIG. 16 and various representative line pressures.

As indicated by the graphical representations FIG. 18, the orifice diameters may be dimensioned to maintain a substantially constant air pressure. It should be noted that the flow restricting orifice sizes are dimensioned so that the amount of air delivered to each diffuser element under pressure is substantially equalized. The orifice sizes are selected based on the total CFM and the required line pressure.

It should be appreciated that a hybrid wind solar panel generator 900 can essentially also be land based. Generator 900 drives an air compressor diffuser for diffused air circulation for hypolimnetic aeration, circulation, or layer aeration schematically illustrated in FIG. 19.

The invention claimed is:

1. An apparatus for circulating water in a body of water comprising:
    a wind turbine;
    a shaft defining an axis and driven by said turbine;
    a first impeller coupled to said shaft for rotation about said axis therewith to create an updraft and a second axially spaced impeller coupled to said shaft for rotation about said axis to create a downdraft; and
    a buoyancy module disposed adjacent said shaft to stabilize said shaft in an upright orientation when a substantial portion of said shaft and said first and second impellers are submerged in a body of water;
    wherein exposure of said wind turbine to environmental wind and positioning said first and second impellers in said body of water, cause said first and second impellers to rotate to thereby circulate water in both an updraft and an opposed downdraft concurrently within said body of water.

2. The apparatus of claim 1 and further comprising a conduit, said first and second impellers being disposed in said conduit and producing a downdraft and an updraft pumping within said conduit.

3. The apparatus of claim 2 further comprising a conduit chamber with an intake port and an output port and at least one of said first impeller and said second impellers is disposed in said conduit chamber and operable to circulate water from said intake port to said output port.

4. The apparatus of claim 1 wherein said wind turbine comprises either a direct drive vertical axis wind turbine or a horizontal axis wind turbine which rotatably couples with said shaft.

5. The apparatus of claim 1 and further comprising a pumping chamber, at least one of said first impeller and said second impellers is disposed within said pumping chamber.

6. The apparatus of claim 1 further comprising a drive shaft compressor coupled to said wind turbine to produce compressed air.

7. The apparatus of claim 1 and further comprising an alternator stator coupled to said wind turbine shaft to generate electricity.

8. The apparatus of claim 7 and further comprising a battery bank, a controller and a motor drivably couplable to said shaft wherein electricity from said alternator stator is employed to power said motor.

9. The apparatus of claim 1 further comprising a solar voltaic array, a battery bank in communication with said array, and a motor powered by said battery bank for driving said shaft or a compressor.

10. The apparatus of claim 1 wherein said wind turbine is a vertical axis wind turbine and further comprising a horizontal axis wind turbine integrated with said vertical axis wind turbine, said vertical axis wind turbine being coupled to said shaft for pumping circulation and to produce compressor-diffused air.

11. The apparatus of claim 1 further comprising a surface flotation platform and a mooring system.

12. The apparatus of claim 11 further comprising an anchor with a pulley connected to said floatation platform, a cable connecting said anchor and disposed around said pulley and connecting with a weight, wherein the vertical spacing between said anchor and said floatation platform varies according to the depth of the water.

13. The apparatus of claim 1 further comprising a plurality of pilings mounted to the bottom of the water body in a fixed upright position, said apparatus further having a platform disposed about said shaft and being telescopically connected with said pilings so that said wind turbine has a position relative to the surface of said water which is substantially constant regardless of change in depth of said water.

14. The apparatus of claim 1 further comprising an anchor having a weight and said buoyancy module has a buoyancy and wherein the buoyancy is significantly less than said weight.

* * * * *